(12) United States Patent
Saeda et al.

(10) Patent No.: US 10,817,236 B2
(45) Date of Patent: Oct. 27, 2020

(54) IMAGE FORMING APPARATUS, SERVICE SYSTEM, CONTROL METHOD, AND RECORDING MEDIUM STORING COMPUTER PROGRAM

(71) Applicant: SHARP KABUSHIKI KAISHA, Sakai, Osaka (JP)

(72) Inventors: Masao Saeda, Sakai (JP); Yasuhiro Nakai, Sakai (JP); Kohji Katamoto, Sakai (JP); Kohichi Murakami, Sakai (JP); Yasutomo Hayano, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/410,525

(22) Filed: May 13, 2019

(65) Prior Publication Data

US 2019/0361654 A1    Nov. 28, 2019

(30) Foreign Application Priority Data

May 22, 2018   (JP) ................. 2018-097698

(51) Int. Cl.
G06F 3/12 (2006.01)
G06Q 30/06 (2012.01)
G06Q 20/08 (2012.01)

(52) U.S. Cl.
CPC .......... G06F 3/1292 (2013.01); G06F 3/1204 (2013.01); G06F 3/1287 (2013.01); G06Q 20/08 (2013.01); G06Q 30/06 (2013.01)

(58) Field of Classification Search
None
See application file for complete search history.

(56) References Cited

U.S. PATENT DOCUMENTS

| 2015/0054852 | A1  | 2/2015 | Ohnuma et al. |
| 2016/0070509 | A1* | 3/2016 | Takahira ............ H04N 1/00307 358/1.15 |
| 2017/0070642 | A1* | 3/2017 | Miyamoto ........... H04N 1/4406 |
| 2018/0024784 | A1* | 1/2018 | Watanabe .......... H04N 1/00973 709/205 |

FOREIGN PATENT DOCUMENTS

| JP | 2015-035767 A | 2/2015 |
| JP | 2015-043123 A | 3/2015 |

* cited by examiner

*Primary Examiner* — Frantz Bataille
(74) *Attorney, Agent, or Firm* — ScienBiziP, P.C.

(57) ABSTRACT

An image forming apparatus includes a short-range wireless communication unit, an acquisition unit that acquires a plurality of pieces of identification information from a plurality of mobile terminals located in a wireless communication area, a display unit that displays the acquired pieces of identification information, an operation input unit that identifies a mobile terminal by using a piece of identification information selected from among the pieces of identification information displayed on the display unit, a data communication unit that receives data only from the selected mobile terminal, and a printing unit. The operation input unit accepts designation, by an operator, of whether to print the received data for each selected mobile terminal. The printing unit prints data in accordance with the designation.

7 Claims, 21 Drawing Sheets

FIG. 3

| | TABULATED INFORMATION | | | | | |
|---|---|---|---|---|---|---|
| | PICTURE ID (001) | PICTURE ID (002) | PICTURE ID (003) | PICTURE ID (004) | PICTURE ID (005) | ····· |
| IDENTIFICATION NUMBER | NUMBER OF PRINTED COPIES | NUMBER OF PRINTED COPIES | NUMBER OF PRINTED COPIES | NUMBER OF PRINTED COPIES | NUMBER OF PRINTED COPIES | ····· |
| 1 | 1 | 1 | 1 | 1 | 1 | ····· |
| 2 | 1 | 1 | 1 | 0 | 1 | ····· |
| 3 | 1 | 0 | 0 | 0 | 0 | ····· |
| 4 | 0 | 0 | 0 | 0 | 0 | ····· |

FIG. 4

PRINT JOB #1 — 161
| IDENTIFICATION NUMBER | 001 | — 162 |
| PICTURE ID | 001 | — 163 |
| PICTURE ID | 002 | — 164 |
| PICTURE ID | 003 | — 165 |

PRINT JOB #2 — 166
| IDENTIFICATION NUMBER | 002 |
| PICTURE ID | 001 |
| PICTURE ID | 002 |

PRINT JOB #3 — 167
| IDENTIFICATION NUMBER | 003 |
| PICTURE ID | 001 |
| PICTURE ID | 002 |
| PICTURE ID | 003 |

FIG. 13A

| PROFILE INFORMATION | ~231 |
|---|---|
| XX CITY, XX PREFECTURE | |

| REGISTRATION FLAG | 1 | ~232 |
|---|---|---|

| MODEL NAME | USER NAME |
|---|---|
| SmartPhone X | YY ICHIRO |

| OS NAME | MODEL NAME | USER NAME |
|---|---|---|
| Operating System 3.0 | ABC123 | XX TARO |

| MODEL NAME | USER NAME | PROFILE INFORMATION |
|---|---|---|
| SmartPhone X | YY ICHIRO | YY CITY, YY PREFECTURE |

| OS NAME | MODEL NAME | USER NAME | PROFILE INFORMATION |
|---|---|---|---|
| Operating System 3.0 | ABC123 | XX TARO | XX CITY, XX PREFECTURE |

IMAGE FORMING APPARATUS, SERVICE SYSTEM, CONTROL METHOD, AND RECORDING MEDIUM STORING COMPUTER PROGRAM

BACKGROUND

1. Field

The present disclosure relates to a technique for transmitting and receiving data between an image forming apparatus and a plurality of mobile terminals via short-range wireless communication, and more specifically to a technique for receiving data only from a plurality of mobile terminals via short-range wireless communication and printing the data by using an image forming apparatus.

2. Description of the Related Art

Multi-function copiers (hereinafter referred to as image forming apparatuses) installed in public places such as convenience stores provide service to users, such as a printing service for printing pictures or documents stored in smartphones (hereinafter referred to as mobile terminals) of the users and a scanning service for reading original document images on sheets and loading the images into the mobile terminals.

The image forming apparatus and the mobile terminals transmit and receive data to and from each other via short-range wireless communication such as wi-fi.

A picture stored in a mobile terminal is typically printed by an image forming apparatus installed in a convenience store in accordance with the following operation procedure, for example.

On an operation screen of the mobile terminal, a user selects the function of printing a picture and selects a picture to be printed. Then, on an operation screen of the image forming apparatus, the user selects the function of receiving the picture from the mobile terminal and printing the picture. Accordingly, a wi-fi connection destination and a connection password are displayed on the image forming apparatus. Then, the user inputs, on the mobile terminal, the wi-fi connection destination displayed on the image forming apparatus and then inputs, on the mobile terminal, the connection password displayed on the image forming apparatus.

Through the operations described above, the setup of wi-fi connection between the image forming apparatus and the mobile terminal is completed, and the picture selected by the user is transmitted from the mobile terminal to the image forming apparatus, and is printed from, the image forming apparatus.

However, as described above, the configuration of wi-fi connection between the image forming apparatus and the mobile terminal involves inputting, on the mobile terminal, the wi-fi connection destination and the connection password displayed on the operation screen of the image forming apparatus. Such wi-fi connection configuration may be time-consuming for the user.

To address this issue, Japanese Unexamined Patent Application Publication No. 2015-35767 discloses an image forming apparatus. The image forming apparatus wirelessly communicates with mobile terminals to automatically detect mobile terminals available for communication within a communication area, and displays a destination selection screen showing the terminal names, media access control (MAC) addresses, email addresses, and so on of the detected mobile terminals on a display unit of the image forming apparatus. A user selects a desired mobile terminal on the displayed destination selection screen. The image forming apparatus transmits information to the selected mobile terminal. As described above, the simplified operation is used to configure wireless connection between the image forming apparatus and a mobile terminal.

Japanese Unexamined Patent Application Publication No. 2015-43123 discloses an image display apparatus to which a plurality of information processing devices are connected. The image display apparatus provides intuitive recognition of the correspondence between the source and the destination to a user during a data transfer operation for transferring data between the information processing devices to allow the user to perform data transfer with a simple operation.

As described above, in Japanese Unexamined Patent Application Publication No. 2015-35767, the operation of configuring wireless connection between an image forming apparatus and a mobile terminal is simplified. However, the connection destination of the image forming apparatus is merely one of the mobile terminals to which information is to be transmitted.

On the other hand, there is a demand for a plurality of users having a certain relationship to receive a printing service provided by a single image forming apparatus by using their mobile terminals over short-range wireless communication.

For example, a plurality of users having a friend relationship gather around an image forming apparatus installed in a convenience store, and receive a printing service provided by the image forming apparatus by using only their mobile terminals as a single unified job. In the printing service, picture data transmitted from each of the mobile terminals is printed.

In this situation, if a mobile terminal of a third party who does not have a friend relationship with the plurality of users having a friend relationship is allowed to join the mobile terminals of the users having a friend relationship, the third party can pick up a printed copy that is created based on the picture data from the mobile terminals of the plurality of users and that is output to a discharge tray of the image forming apparatus, which may cause inconvenience.

It is desirable to provide an image forming apparatus, a service system, a control method, and a recording medium storing a computer program that can minimize the occurrence of the inconvenience described above while satisfying the demand for a plurality of users having a certain relationship to receive a printing service provided by a single image forming apparatus by using their mobile terminals over short-range wireless communication.

SUMMARY

According to an aspect of the disclosure, there is provided an image forming apparatus including a wireless communication unit, for communicating with a mobile terminal. The image forming apparatus includes an acquisition unit, a display unit, a first input unit, a data communication unit, a second input unit, and a printing unit. The acquisition unit acquires a plurality of pieces of identification information from a plurality of mobile terminals located in a communication area via the wireless communication unit, each of the plurality of pieces of identification information indicating one of the plurality of mobile terminals. The display unit displays the acquired plurality of pieces of identification information. The first input unit accepts selection of at least one of the pieces of identification information displayed on the display unit and to identify at least one mobile terminal by using the selected at least one of the pieces of identification information. The data communication unit receives data only from the at least one mobile terminal identified by the first input unit via the wireless communication unit. The second input unit accepts a designation of whether to print the received data for each of the identified at least one mobile terminal in accordance with operation by an operator. The printing unit prints data in accordance with the designation accepted by the second input unit.

According to another aspect of the disclosure, there is provided a service system, including a plurality of mobile terminals and an image forming apparatus including a wireless communication unit and communicating with the plurality of mobile terminals. The image forming apparatus includes an acquisition, unit, a display unit, a first input unit, a data communication unit, a second input unit, and a printing unit. The acquisition unit to acquires a plurality of pieces of identification information from a plurality of mobile terminals located in a communication area among the plurality of mobile terminals via the wireless communication unit, each of the plurality of pieces of identification information indicating one of the plurality of mobile terminals located in the communication area. The display unit displays the acquired plurality of pieces of identification information. The first input unit accepts selection of at least one of the pieces of identification information displayed on the display unit and to identify at least one mobile terminal by using the selected at least one of the pieces of identification information. The data communication unit receives data only from the at least one mobile terminal identified by the first input unit via the wireless communication unit. The second input unit accepts a designation of whether to print the received data for each of the identified at least one mobile terminal in accordance with operation by an operator. The printing unit prints data in accordance with the designation accepted by the second input unit.

According to another aspect of the disclosure, there is provided a control method performed by an image forming apparatus. The image forming apparatus includes a wireless communication unit and communicating with a mobile terminal. The control method includes acquiring a plurality of pieces of identification information from a plurality of mobile terminals located in a communication area via the wireless communication unit, each of the plurality of pieces of identification information indicating one of the plurality of mobile terminals; displaying the acquired plurality of pieces of identification information; accepting selection of at least one of the displayed pieces of identification information, and identifying at least one mobile terminal by using the selected at least one of the pieces of identification information; receiving data only from the identified at least one mobile terminal via the wireless communication unit; accepting a designation of whether to print the received data for each of the identified at least one mobile terminal in accordance with operation by an operator; and printing data in accordance with the accepted designation.

According to another aspect of the disclosure, there is provided a recording medium storing a computer program for control. The computer program, is executable by an image forming apparatus. The image forming apparatus includes a wireless communication unit and communicating with a mobile terminal. The computer program acquiring a plurality of pieces of identification information from a plurality of mobile terminals located in a communication area via the wireless communication unit, each of the plurality of pieces of identification information indicating one of the plurality of mobile terminals; display the acquired plurality of pieces of identification information; accept selection of at least one of the displayed pieces of identification information, and identify at least one mobile terminal by using the selected at least one of the pieces of identification information; receive data only from the identified at least one mobile terminal via the wireless communication unit; accept a designation of whether to print the received data for each of the identified at least one mobile terminal in accordance with operation by an operator; and print data in accordance with the accepted designation.

BRIEF DESCRIPTION OF THE DRAWINGS

FIG. 3 illustrates a data structure of a tabulated list stored in a storage unit, by way of example;

FIG. 4 illustrates an example data structure of print jobs generated by a job generation unit;

FIG. 13A illustrates an example of profile information and a registration flag;

FIGS. 13B and 13C illustrate examples of basic information;

FIGS. 13D and 13E illustrate examples of identification information;

DESCRIPTION OF THE EMBODIMENTS

1 Embodiment

A service system 1 according to an embodiment of the present disclosure will be described with reference to the drawings.

1.1 Service System 1

Figure 1:
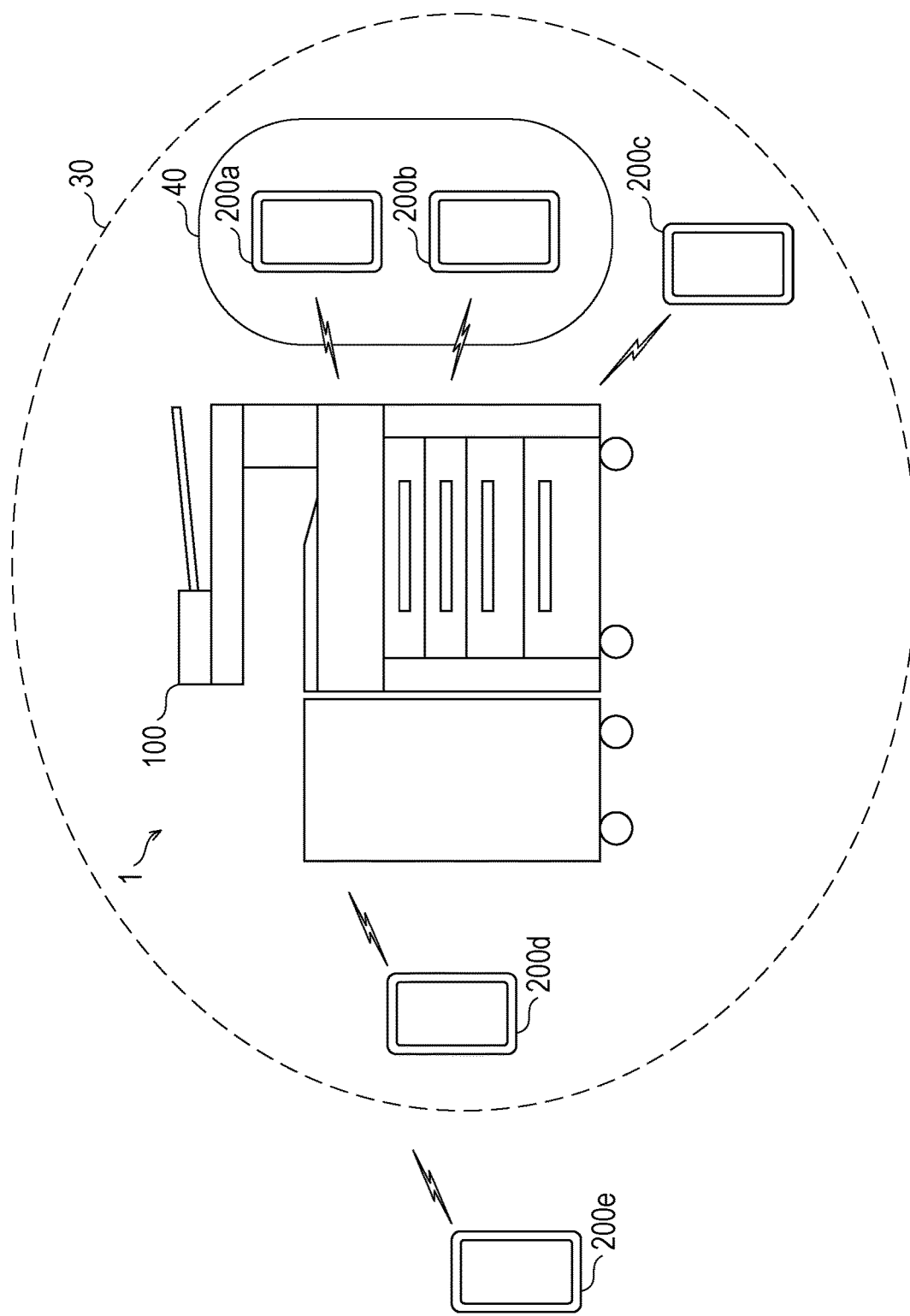
FIG. 1 is a schematic configuration diagram illustrating a schematic configuration of a service system.

FIG. 1 is a schematic configuration diagram illustrating a schematic configuration of the service system 1.

The service system 1 provides services to users, such as a printing service for printing document data, picture data, and so on stored in mobile terminals 200a, 200b, etc. onto paper media by using an image forming apparatus 100, and a scanning service for transmitting multi-level image data read by the image forming apparatus 100 from an original document to the mobile terminals 200a, 200b, etc.

The service system 1 includes the image forming apparatus 100, which is installed in, for example, a public place such as a convenience store, and the mobile terminals 200a, 200b, 200c, and 200d, which are located in a wireless communication area 30 centered on the image forming apparatus 100, such that the image forming apparatus 100 and the mobile terminals 200a, 200b, 200c, and 200d are interconnected via short-range wireless communication so as to be capable of communicating with each other. As illustrated in FIG. 1, a mobile terminal 200e is located outside the wireless communication area 30 and thus is not connected to the image forming apparatus 100 via short-range wireless communication. The short-range wireless communication is defined by Wi-fi, which is one of the wireless local area network (LAN) standards, by way of example.

The mobile terminals 200a and 200b, which are included in a group 40 illustrated in FIG. 1 (the group 40 is referred to as the selection group 40), are a plurality of specific mobile terminals, by way of example. Only the plurality of specific mobile terminals share the image forming apparatus 100 for use over short-range wireless communication. A plurality of users having the mobile terminals 200a and 200b have a certain relationship such as a relationship between a plurality of users who belong to the same organization, a friend relationship, or a family relationship.

For example, the mobile terminals 200a and 200b located in the wireless communication area 30 transmit picture data stored therein to the image forming apparatus 100 via short-range wireless communication, and the image forming apparatus 100 receives the picture data and prints the received picture data by using a printing unit 115 described below.

The image forming apparatus 100 reads an original document image on an original document by using an image reading unit 116 described below to generate multi-level image data, and transmits the generated multi-level image data to the mobile terminals 200a and 200b located in the wireless communication area 30 via short-range wireless communication. The mobile terminals 200a and 200b receive the multi-level image data and store the received multi-level image data. The mobile terminals 200a and 200b are capable of displaying the stored multi-level image data in accordance with operation by their users.

Accordingly, even when away from home, a user stops by a convenience store and can print data stored in the mobile terminal onto a paper medium or store image data read from a paper medium or the like in the mobile terminal to utilize the paper medium and the data. In addition, only a plurality of specific mobile terminals share the single image forming apparatus 100 for use over short-range wireless communication. The mobile terminals 200c and 200d, which are not included in the selection group 40, are not allowed to join the service used by the mobile terminals 200a and 200b.

1.2 Image Forming Apparatus 100

Figure 2:
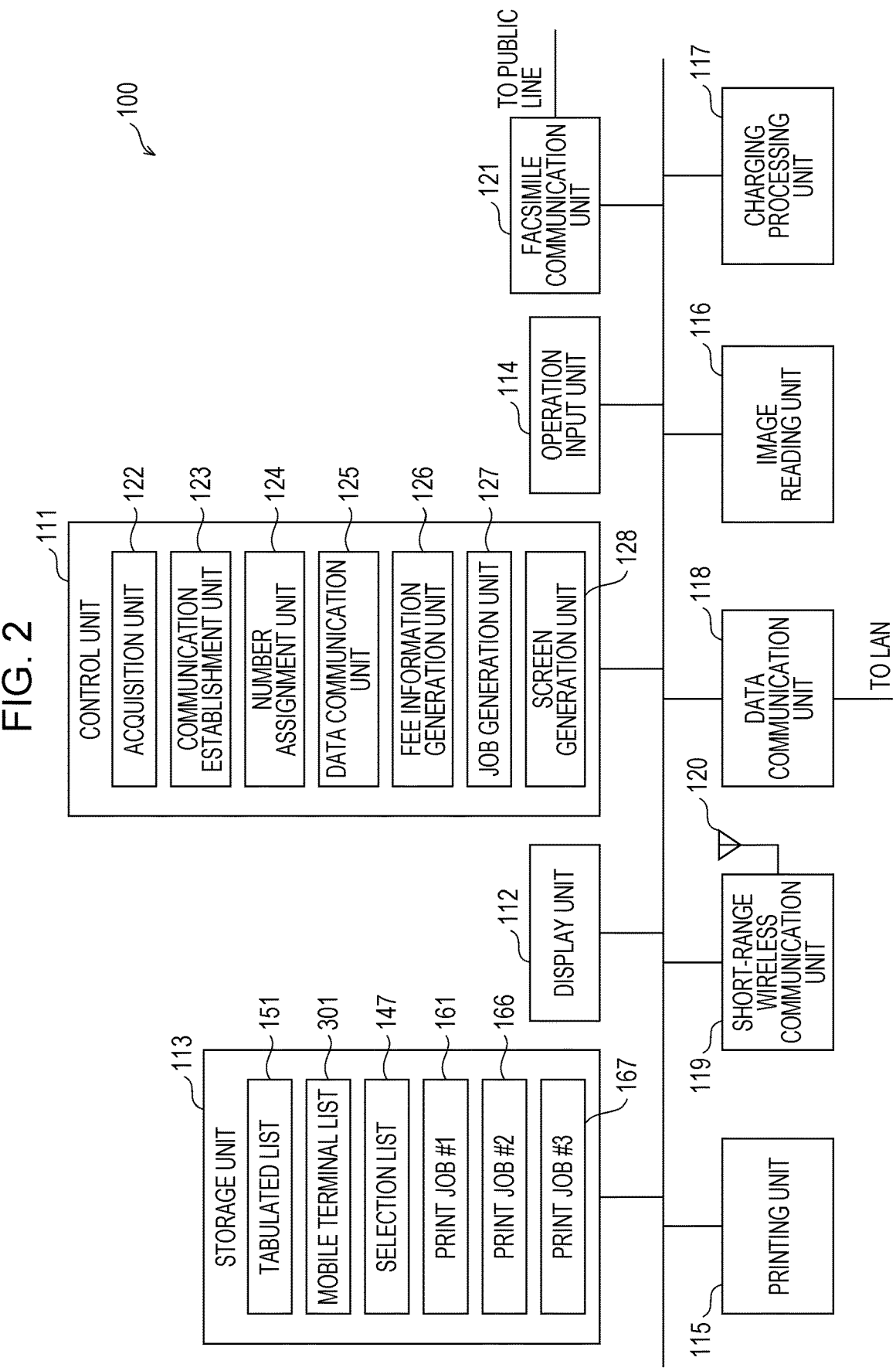
FIG. 2 is a functional block diagram illustrating a functional configuration of an image forming apparatus.

FIG. 2 is a functional block diagram, illustrating a functional configuration of the image forming apparatus 100.

The image forming apparatus 100 is an apparatus having functions such as a copying function, a facsimile function, and a printer function. As illustrated in FIG. 2, the image forming apparatus 100 includes a control unit 111, a display unit 112, a storage unit 113, an operation input unit 114, a printing unit 115, an image reading unit 116, a charging processing unit 117, a data communication unit 118, a short-range wireless communication unit 119, an antenna 120, and a facsimile communication unit 121.

(1) Storage Unit 113

The storage unit 113 includes a random, access memory (RAM) serving as a work area for a control program executed by the control unit 111, and a hard disk drive (HDD) that stores various control programs, application, programs, image data, and so on.

The storage unit 113 stores a mobile terminal list 301, a selection list 147, a tabulated list 151, print jobs 161, 166, and 167, and so on.

Mobile Terminal List 301

The mobile terminal list 301 includes identification information indicating one or more mobile terminals located in the wireless communication, area 30. The identification information includes basic information described below, and may further include profile information described below. The basic information, includes the operating system (OS) name, model name, user name, and the like of each mobile terminal. The mobile terminal list 301 is generated when the image forming apparatus 100 starts providing a wireless communication transmission service described below and searches for mobile terminals located in the wireless communication area 30.

Selection List 147

The selection list 147 includes identification information selected by the user from among one or more pieces of identification information included in the mobile terminal list 301. The image forming apparatus 100 communicates with a mobile terminal indicated by the identification information included in the selection list 147 via short-range wireless communication. The image forming apparatus 100 does not communicate with a mobile terminal indicated by identification information not included in the selection list 147 via short-range wireless communication. The image forming apparatus 100 excludes access from a mobile terminal indicated by identification information not included in the selection list 147.

The tabulated list 151 is a tabulated list generated, when the designation of a picture to be printed by a user is accepted on a screen 320 (FIG. 7) described below for each picture and each mobile terminal, in accordance with the accepted designation.

As with a data structure illustrated in FIG. 3, by way of example, the tabulated list 151 includes one or multiple pieces of tabulated information. Each piece of tabulated information includes an identification number and multiple numbers of printed copies. Each of the multiple numbers of printed copies corresponds to one of a plurality of picture IDs.

The one or multiple pieces of tabulated information correspond to one or multiple pieces of identification information included in the selection list 147. The identification number is a number uniquely identifying a mobile terminal. The picture IDs are each identification information identifying one of the pictures displayed on the screen 320. The numbers of printed copies each correspond to the number of copies designated on the screen 320.

In the tabulated list 151, accordingly, the number of printed copies is recorded for each identification number identifying a mobile terminal and for each picture ID identifying a picture.

In the tabulated list 151, specifically, for a mobile terminal identified by an identification number 154, the numbers of printed copies 156, 157, etc. of pictures identified by picture IDs 152, 153, etc. are recorded. Also, for each of mobile terminals identified by an identification number 155 and so on, the numbers of printed copies of a plurality of pictures identified by a plurality of picture IDs are recorded.

Since the screen 320 accepts the designation of a picture to be printed (designation of whether to print a picture) by the user for each picture and for each mobile terminal, the number of printed copies recorded in the tabulated list 151 for each identification number and for each picture ID is "0" or "1". If the screen 320 accepts the designation of the number of copies to be printed for a picture by the user for each picture and for each mobile terminal, the number of printed copies recorded in the tabulated list 151 for each identification number and for each picture ID is a value greater than or equal to "0".

Print Jobs 161, 166, and 167

The print jobs 161, 166, and 167 are each a print job generated for each mobile terminal, when the designation of a picture to be printed is accepted for each mobile terminal and each picture on the screen 320 in accordance with operation by the user and the designation is confirmed, in accordance with the accepted designation.

Each of the print jobs 161, 166, and 167 includes an identification number identifying a mobile terminal, and one or multiple picture IDs each identifying a picture.

As with a data structure illustrated in FIG. 4, by way of example, the print job 161 includes an identification number 162 and picture IDs 163, 164, and 165. That is, the print job 161 indicates that, for the mobile terminal identified by the identification number 162, the pictures identified by the picture IDs 163, 164, and 165 are designated in accordance with operation by the user and that the pictures identified by the picture IDs 163, 164, and 165 are printed.

Like the print job 161, each of print jobs 166 and 167 also indicates, as with the data structure illustrated in FIG. 4, by way of example, that, for a mobile terminal identified by the identification number included in the print job, pictures identified by picture IDs included in the print job are designated in accordance with operation by the user and that the pictures identified by the picture IDs are printed.

(2) Control Unit 111

The control unit 111 reads a necessary program or the like from the storage unit 113 and executes the program or the like to control the overall operation of the image forming apparatus 100. The control unit 111 includes an acquisition unit 122, a communication establishment unit 123, a number assignment unit 124, a data communication unit 125, a fee information generation unit 126, a job generation unit 127, a screen generation unit 128, and so on.

(a) Acquisition Unit 122

The acquisition unit 122 acquires, from one or multiple mobile terminals located in the wireless communication area 30, identification information that identifies the mobile terminal(s) by using short-range wireless communication. If the identification information includes profile information, the acquisition unit 122 acquires identification information including profile information.

(b) Communication Establishment Unit 123

The communication establishment unit 123 establishes communication only between the image forming apparatus 100 and each of the one or multiple mobile terminals indicated by the identification information included in the selection list 147 by using the short-range wireless communication unit 119 via snort-range wireless communication.

(c) Number Assignment Unit 124

The number assignment unit 124 generates an identification number to be assigned to a mobile terminal indicated by the acquired identification information. The identification number uniquely identifies the mobile terminal. Identification numbers are included in the print jobs 161, 166, and 167 illustrated in FIG. 4. Further, the identification numbers are displayed on the screen 320.

(d) Data Communication Unit 125

The data communication unit 125 transmits and receives data only between the image forming apparatus 100 and each of a plurality of mobile terminals included in the selection group. For example, the data communication unit 125 receives picture data, document data, and so on from each mobile terminal by using the short-range wireless communication unit 119, and transmits multi-level image data to each mobile terminal by using the short-range wireless communication unit 119. The data communication unit 125 further transmits fee information described below to one specific mobile terminal or each of a plurality of mobile terminals.

(e) Fee Information Generation Unit 126

The fee information generation unit 126 generates fee information indicating a fee for the provision of a printing service or a scanning service. In the case of a single mobile terminal, the fee information generation unit 126 generates fee information on the mobile terminal. In the case of a plurality of mobile terminals, the fee information generation unit 126 distributes fees to be paid by the plurality of mobile terminals to the respective mobile terminals and generates fee information on each of the mobile terminals.

Further, the fee information generation unit 126 determines whether to collectively charge a specific one of the plurality of mobile terminals or individually charge the plurality of mobile terminals in accordance with a payment method described below (whether to collectively charge one specific mobile terminal or individually charge a plurality of mobile terminals). When one specific mobile terminal is collectively charged, the fee information generation unit 126 generates fee information indicating fees collectively charged to the specific mobile terminal. In contrast, when the plurality of mobile terminals are individually charged, the fee information generation unit 126 generates fee information indicating a fee charged to each of the plurality of mobile terminals.

(f) Job Generation Unit 127

The job generation unit 127 generates a print job for each mobile terminal in the following way in accordance with the tabulated list 151 stored in the storage unit 113.

The job generation unit 127 repeatedly performs the following steps (i) to (iv) for all the pieces of tabulated information included in the tabulated list 151.

(i) The job generation unit 127 sequentially reads one piece of tabulated information after the other from the tabulated list 151 stored in the storage unit 113.

(ii) The job generation unit 127 extracts an identification number from the read tabulated information.

(iii) The job generation unit 127 extracts all the picture IDs corresponding to the number of printed copies "1" by using the read tabulated information.

(iv) The job generation unit 127 generates a print job including the identification number extracted in the step (ii) and all the picture IDs extracted in the step (iii) and writes the generated print job to the storage unit 113.

The print job generated in the way described above is executed by the printing unit 115.

(g) Screen Generation Unit 128

Figure 10:
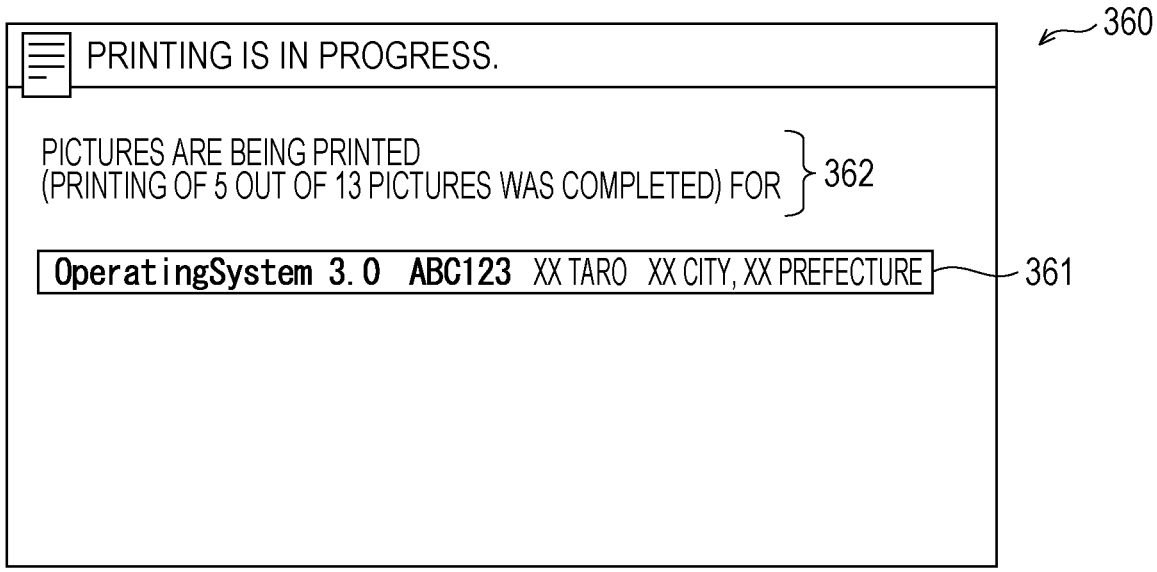
FIG. 10 illustrates a screen displayed on the display unit, by way of example, to notify each user that picture data is being printed.
Figure 11:
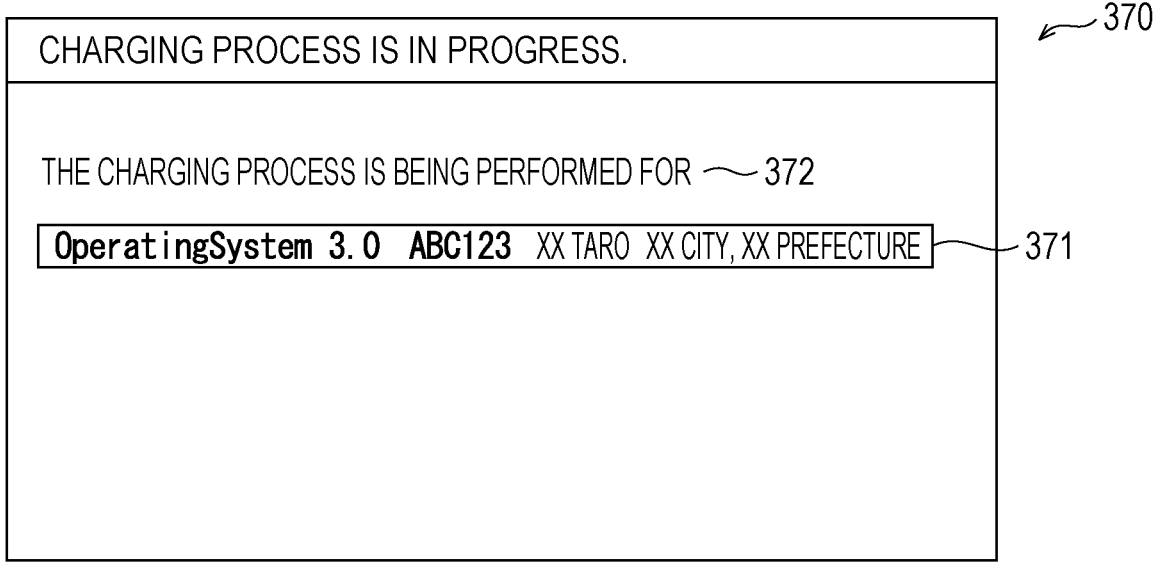
FIG. 11 illustrates a screen displayed on the display unit, by way of example, to notify each user that the charging process is in progress.

The screen generation unit 128 generates screens displayed on the display unit 112, such as a screen 300 (FIG. 5), a screen 310 (FIG. 6), the screen 320 (FIG. 7), a screen 340 (FIG. 8), a screen 350 (FIG. 9), a screen 360 (FIG. 10), and a screen 370 (FIG. 11).

Screen 300

Figure 5:
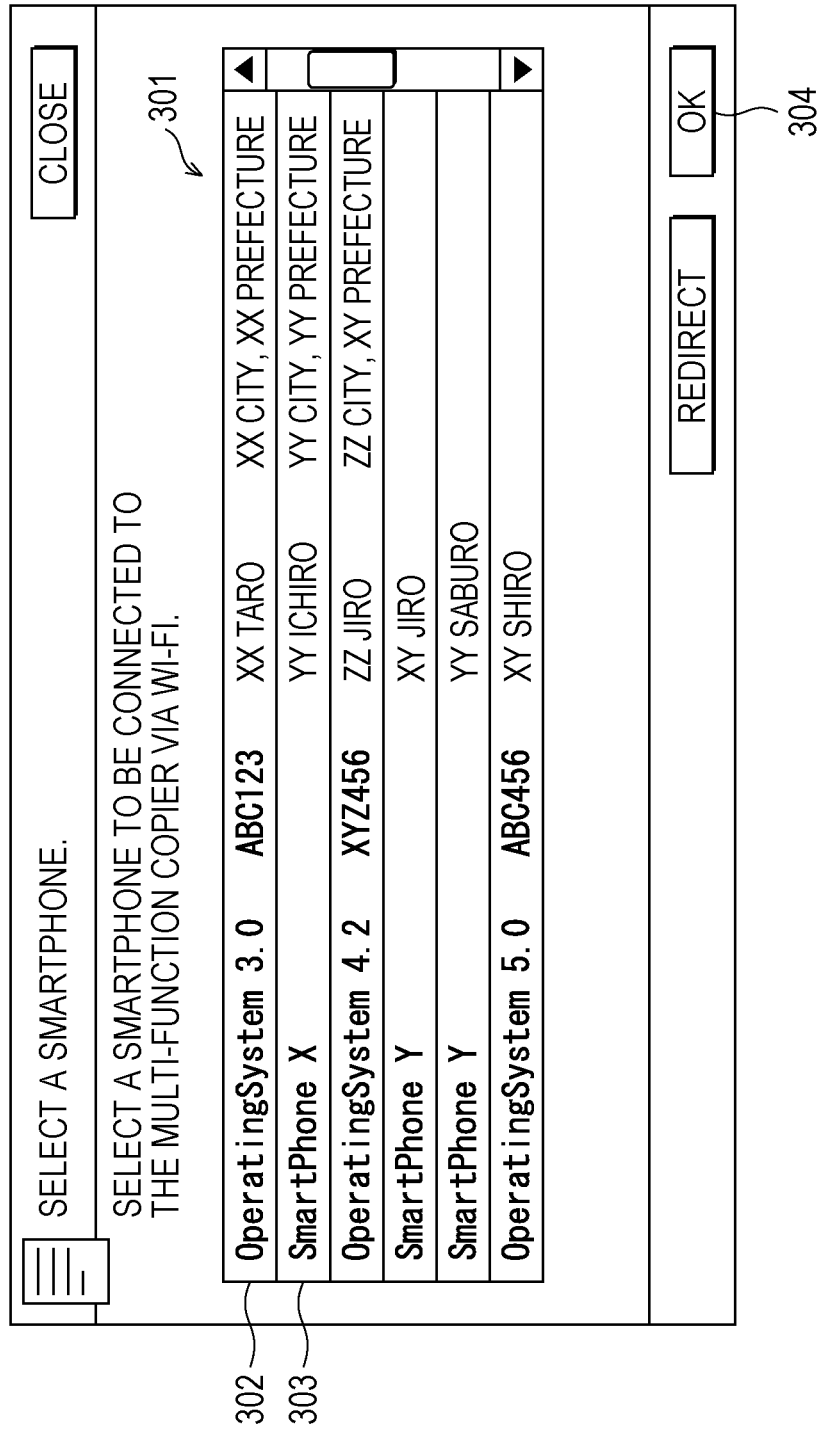
FIG. 5 illustrates a screen displayed on a display unit of the image forming apparatus, by way of example, the screen including a mobile terminal list.

The screen generation unit 128 generates the screen 300 illustrated in FIG. 5, by way of example. The screen 300 is used to select one or multiple mobile terminals in accordance with operation by the user.

The screen 300 includes the mobile terminal list 301 together with various messages and an operation image 304 (OK icon) or the like that is touched by the user. The mobile terminal list 301 includes a plurality of pieces of identification information 302, 303, etc. Each of the pieces of identification information included in the mobile terminal list 301 is information indicating a mobile terminal that is confirmed to be located in the wireless communication area 30 centered on the image forming apparatus 100. Each piece of identification information includes, for example, the version number of the OS used in the mobile terminal, the model number of the mobile terminal, the name of the user, profile information of the user, and so on. By referring to the identification information displayed on the mobile terminal list 301, the user is able to identify their own mobile terminal from other mobile terminals.

One or multiple pieces of identification information are selected from among the plurality of pieces of identification information 302, 303, etc. displayed on the screen 300 in accordance with operation by the user. After the selection of one or multiple pieces of identification information, the selection of identification information by the user is confirmed in response to a touch of the operation image 304.

The one or multiple pieces of identification information selected by the user form a single selection list.

Screen 310

Figure 6:
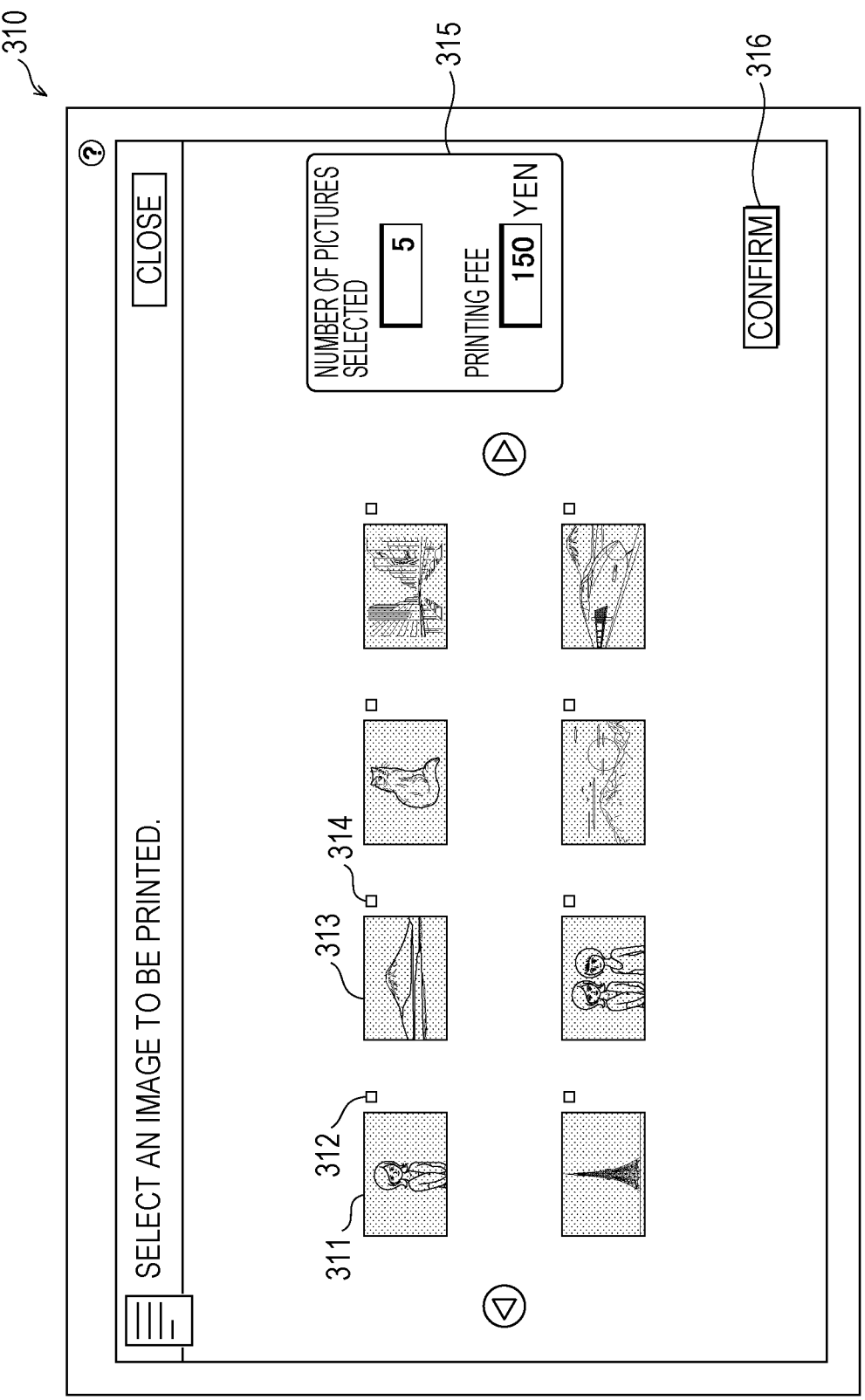
FIG. 6 illustrates a screen displayed on the display unit, by way of example, on which a user of the image forming apparatus selects a picture.

The screen generation unit 128 generates the screen 310 illustrated in FIG. 6, by way of example. The screen 310 is used to select a picture in accordance with operation by the user when the selection list 147 includes one piece of identification information, that is, when communication has been established between the image forming apparatus 100 and a single mobile terminal.

The screen 310 includes various messages, a plurality of pictures 311, 313, etc., checkboxes 312, 314, etc. respectively corresponding to the plurality of pictures 311, 313, etc., a total display field 315, an operation image 316 (Confirm icon) that is touched by the user, and so on. The total display field 315 includes the number of pictures selected and the total printing fee.

One or multiple checkboxes among the plurality of checkboxes 312, 314, etc. displayed on the screen 310 are checked in accordance with operation by the user. Through this operation, a picture(s) is selected. When the operation image 316 is touched after the check of the checkbox(es), the selection of the picture(s) by the user is confirmed.

Screen 320

Figure 7:
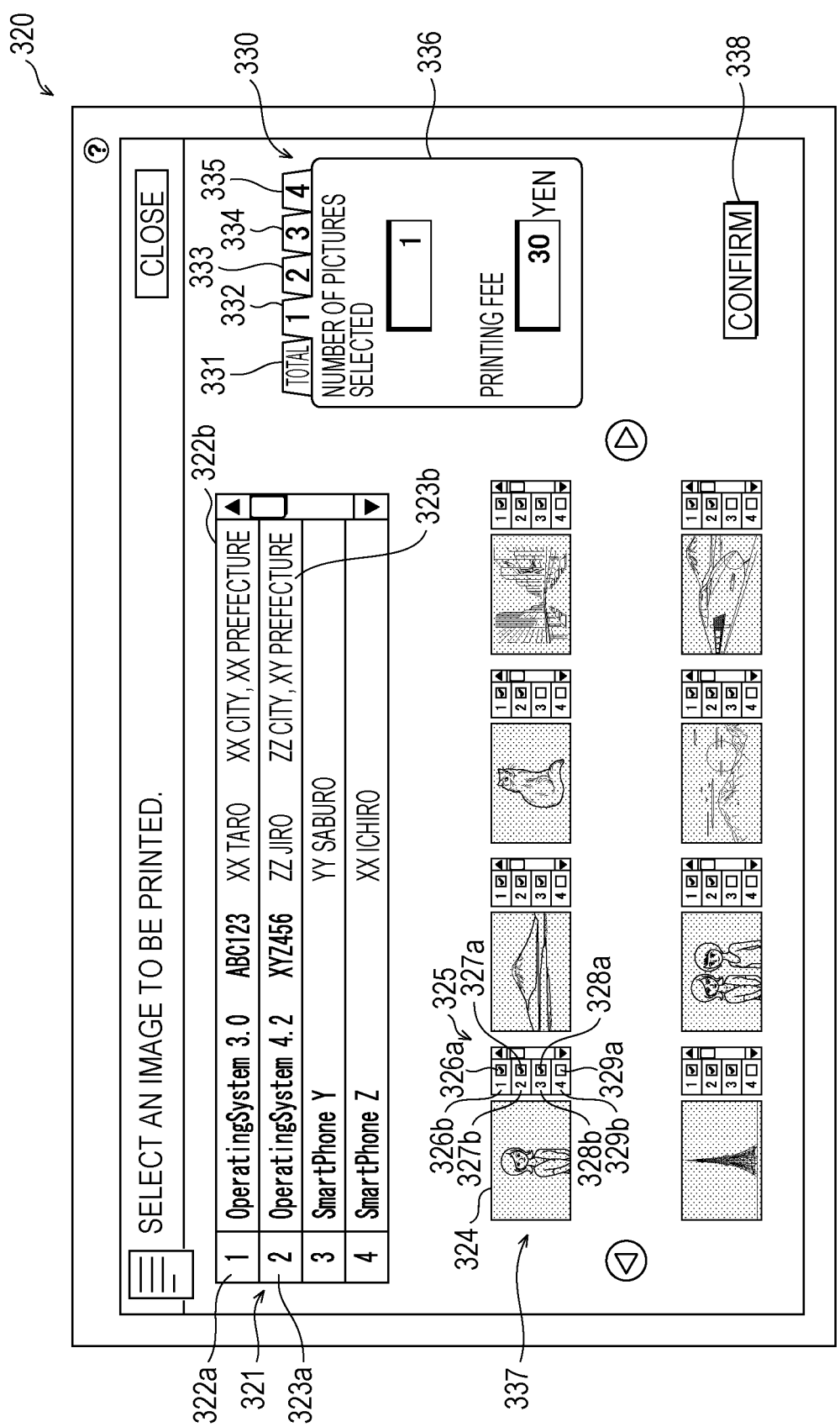
FIG. 7 illustrates a screen displayed on the display unit, by way of example, on which users select pictures.

The screen generation unit 128 generates the screen 320 illustrated in FIG. 7, by way of example. The screen 320 is used to select a picture in accordance with operation by the user when the selection list 147 includes a plurality of pieces of identification information, that is, when communication has been established between the image forming apparatus 100 and a plurality of mobile terminals.

The screen 320 includes various messages, a mobile terminal list 321, a picture list 337, a total display field 330, and an operation image 338 (Confirm icon) that is touched by the user, and so on.

The mobile terminal list 321 includes a plurality of sets each including an identification number and identification information. The plurality of pieces of identification information included in the mobile terminal list 321 are the same as the plurality of pieces of identification information included in the selection list 147. Each identification, number is a number uniquely identifying the corresponding piece of identification information.

Specifically, as illustrated in FIG. 7, the mobile terminal list 321 includes a set of identification number 322*a* and identification information 322*b*, a set of identification number 323*a* and identification information 323*b*, and so on. The identification number 322*a* identifies the corresponding identification information 322*b*, and the identification number 323*a* identifies the corresponding identification information 323*b*. The same applies to the subsequent identification numbers.

By referring to the mobile terminal list 321, the user is able to know an identification number corresponding to identification information.

The picture list 337 includes a plurality of sets each including a picture and a check column. The check column in each set includes a plurality of identification numbers and a plurality of checkboxes, the number of which is equal to the number of identification numbers, in association with each other.

For example, a check column 325 corresponding to a picture 324 includes checkboxes 326*a*, 327*a*, 328*a*, and 329*a*, and identification numbers 326*b*, 327*b*, 328*b*, and 329*b* that are respectively adjacent to the checkboxes 326*a*, 327*a*, 328*a*, and 329*a*. The identification numbers 326*b*, 327*b*, 328*b*, and 329*b* included in the check column 325 correspond to the plurality of identification numbers included in the mobile terminal list 321.

The user refers to the identification information in the mobile terminal list 321 to know the identification number assigned to their mobile terminal. Then, the user checks the checkbox corresponding to the identification number assigned to their mobile terminal in the check column 325. Accordingly, the user is able to select a picture for each picture and for each mobile terminal (for each piece of identification information).

The total display field 330 selectively displays a set of the total number of pictures selected on the screen 320 and the total printing fee and a set of the number of pictures selected for each piece of identification information and the total printing fee. That is, when a tab 331 is operated in the total display field 330, the total number of pictures selected on the screen 320 and the total printing fee are displayed. In contrast, when each of tabs 332, 333, 334, and 335 is operated, the number of pictures selected for the corresponding one of the pieces of identification information and the total printing fee for the corresponding one of the pieces of identification information are displayed.

When the user touches the operation image 338, the selection of a picture(s) on the screen 320 by the user is confirmed.

On the screen 320, the displayed content regarding the same identification number may be displayed in the same color.

For example, the identification number "1" and the identification information associated therewith are displayed in red in the mobile terminal list 321, the identification number "1" and the checkbox associated therewith are displayed in red in the picture list 337, and the identification number "1" and the number of pictures and printing fee associated therewith are displayed in red in the total display field 330.

Further, the identification number "2" and the identification information associated therewith are displayed in blue in the mobile terminal list 321, the identification number "2" and the checkbox associated therewith are displayed in blue in the picture list 337, and the identification number "2" and the number of pictures and printing fee associated therewith are displayed in blue in the total display field 330.

Further, the identification number "3" and the identification information associated therewith are displayed in green in the mobile terminal list 321, the identification number "3" and the checkbox associated therewith are displayed in green in the picture list 337, and the identification number "3" and the number of pictures and printing fee associated therewith are displayed in green in the total display field 330. The same applies to the subsequent identification numbers.

Accordingly, a user is able to identify the displayed content regarding an identification number from the displayed content regarding other identification numbers by color. In this case, no identification number may be displayed in the mobile terminal list 321, the picture list 337, and the total display field 330. This is because the user is able to identify the pieces of displayed content from each other by using colors instead of using identification numbers.

Alternatively, on the screen 320, the displayed content regarding the same identification number may be shown using the name of the user, an abbreviation of the name, or the like, instead of using the identification number. The name of the user, an abbreviation of the name, or the like may be an item included in the basic information.

Screen 340

Figure 8:
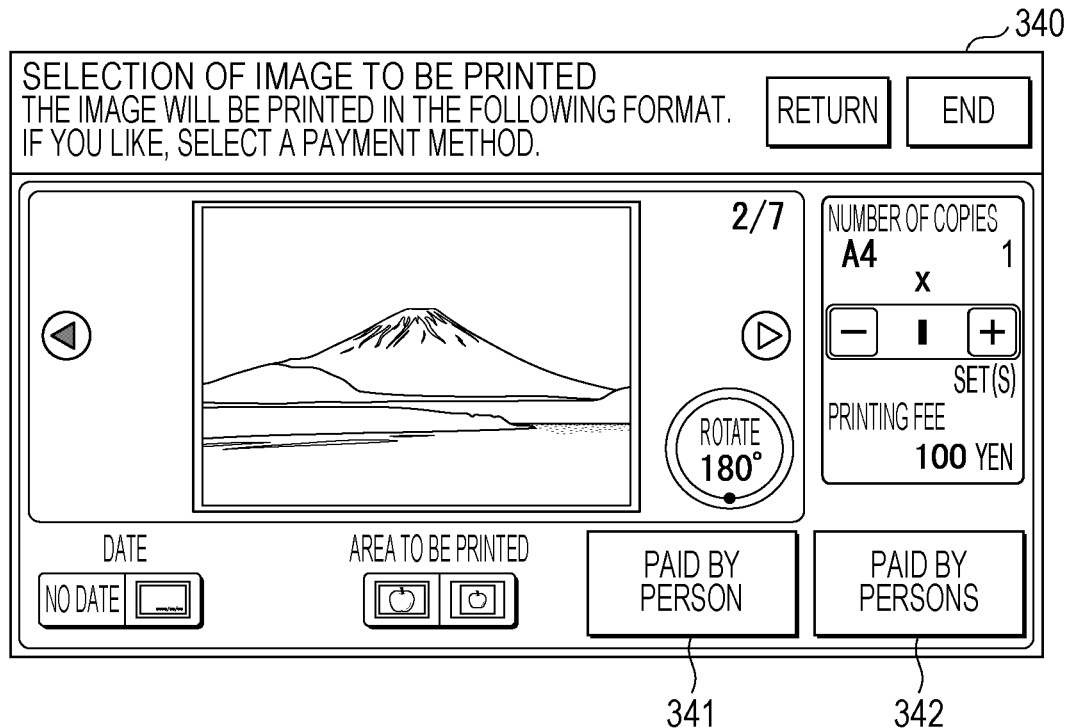
FIG. 8 illustrates a screen displayed on the display unit, by way of example, on which a user selects a payment method.

The screen generation unit 128 generates the screen 340 illustrated in FIG. 8, by way of example. The screen 340 is used to prompt a user to select a payment method. When a plurality of mobile terminals have used a service provided by the image forming apparatus 100, the payment method indicates whether to collectively charge one specific mobile terminal or individually charge the plurality of mobile terminals. That is, the payment method indicates whether the fee is to be paid by a user or users.

The screen 340 includes an operation image 341 that is touched by the user to select payment by a person, and an operation image 342 that is touched by the user to select payment by persons. When the operation image 341 is touched, the fees for the service are paid by a specific one of the plurality of mobile terminals. When the operation image 342 is touched, the fees are paid by the plurality of mobile terminals.

Screen 350

Figure 9:
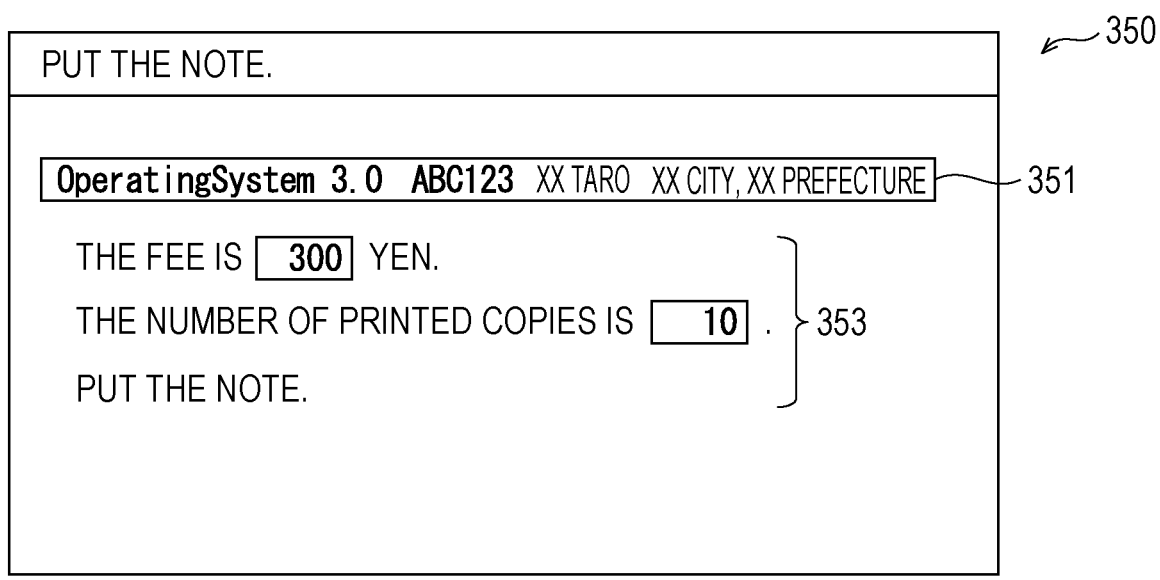
FIG. 9 illustrates a screen displayed on the display unit, by way of example, to prompt each user to pay cash for the printing fee.

The screen generation unit 128 generates the screen 350 illustrated in FIG. 9, by way of example. The screen 350 includes a message that prompts a user to put the note to pay the fee by cash, identification information 351 that identifies the mobile terminal of the user who is to pay the fee, and information 353 such as the fee and the number of printed copies.

Screen 360

The screen generation unit 128 generates the screen 360 illustrated in FIG. 10, by way of example.

The screen 360 includes a message 362 indicating that printing is in progress when pictures are being printed, and identification information 361 that identifies the mobile terminal of the user who has selected the pictures to be printed.

Screen 370

The screen generation unit 128 generates the screen 370 illustrated in FIG. 11, by way of example.

The screen 370 includes a message 372 indicating that a charging process is in progress when the charging process is being performed, and identification information 371 that identifies the mobile terminal of the user to be charged.

(3) Image Reading Unit 116 and Printing Unit 115

The image reading unit 116 reads an original document image on an original document and generates multi-level image data.

The printing unit 115 prints and records, for example, the multi-level image data generated by the image reading unit 116 or picture data or document data received from each mobile terminal on a paper medium or the like by using electrophotographic technology. In this case, the printing unit 115 may collectively print picture data or document data for each of the mobile terminals in the selection group.

(4) Display Unit 112

The display unit 112 is a liquid crystal display device, for example. The display unit 112 may be any type of device such as an electroluminescent (EL) display device. The display unit 112 may be a compact one formed integrally with the image forming apparatus 100 or may be a large one connected to the image forming apparatus 100.

The display unit 112 displays the screen 300, the screen 310, the screen 320, the screen 340, the screen 350, the screen 360, the screen 370, and so on.

(5) Operation Input Unit 114

The operation input unit 114 has a plurality of operation keys and a touch panel overlaid on a screen of the display unit 112. The operation input unit 114 outputs an input instruction corresponding to an operation with the operation keys or an operation on the touch panel by the operator of the image forming apparatus 100 to the control unit 111.

For example, in response to the input instruction from the operation input unit 114, the control unit 111 controls the printing unit 115 to print picture data received from a mobile terminal onto a paper medium or the like by using the printing unit 115. In response to the input instruction from the operation input unit 114, furthermore, the control unit 111 controls the image reading unit 116 to read an image on an original document by using the image reading unit 116, and controls the printing unit 115 to print the read image onto a paper medium or the like by using the printing unit 115. Further, the operation input unit 114 accepts the input of a payment method by the user's operation, for example. The payment method is payment by cash or mobile terminal.

Further, the operation input unit 114 accepts the selection of one or multiple pieces of identification information among the plurality of pieces of identification information 302, 303, etc. in the mobile terminal list 301 displayed on the screen 300 in response to a touch of the operator, and forms a selection list including the selected identification information. That is, the operation input unit 114 accepts the selection of a plurality of pieces of identification information, which correspond to at least some of the pieces of displayed identification information, in accordance with operation by the operator, and identifies a selection group including a plurality of mobile terminals indicated by the selected plurality of pieces of identification information.

The operation input unit 114 further accepts the selection of a picture on the screen 310 in response to a touch of the operator. Further, the operation input unit 114 accepts the designation of whether, for each piece of received picture data, each of the users of the plurality of mobile terminals included in the selection group prints the piece of picture data on the screen 320 in response to a touch of the operator.

Further, the operation input unit 114 accepts the input of a payment method for paying a fee for the use of a service provided from the image forming apparatus 100, such as a printing service or a scanning service, on the screen 340 in response to a touch of the user. The payment method indicates whether to collectively charge a specific one of a plurality of mobile terminals that have used a service provided by the image forming apparatus 100 or individually charge the plurality of mobile terminals.

(6) Charging Processing Unit 117, Data Communication Unit 118, Short-Range Wireless Communication Unit 119, and Facsimile Communication Unit 121

The charging processing unit 117 executes a process for charging a use fee for a printing service, a scanning service, or the like.

The data communication unit 118 performs data communication with any other server device via a network such as a LAN.

The short-range wireless communication unit 119 communicates with a mobile terminal of a user located in the wireless communication area 30 via the antenna 120 over short-range wireless communication.

The facsimile communication unit 121 performs facsimile communication with any other facsimile terminal or the like via a public line or the like.

1.3 Mobile Terminals 200a, 200b, . . . , and 200e

A description will be given here of the mobile terminal 200a as a representative of the mobile terminals 200a, 200b, . . . , and 200e. The mobile terminals 200b, . . . , and 200e have substantially the same configuration as the mobile terminal 200a and will not be described herein. The components of the mobile terminals 200b, . . . , and 200e are denoted by the same numerals as those of the components of the mobile terminal 200a.

Figure 12:
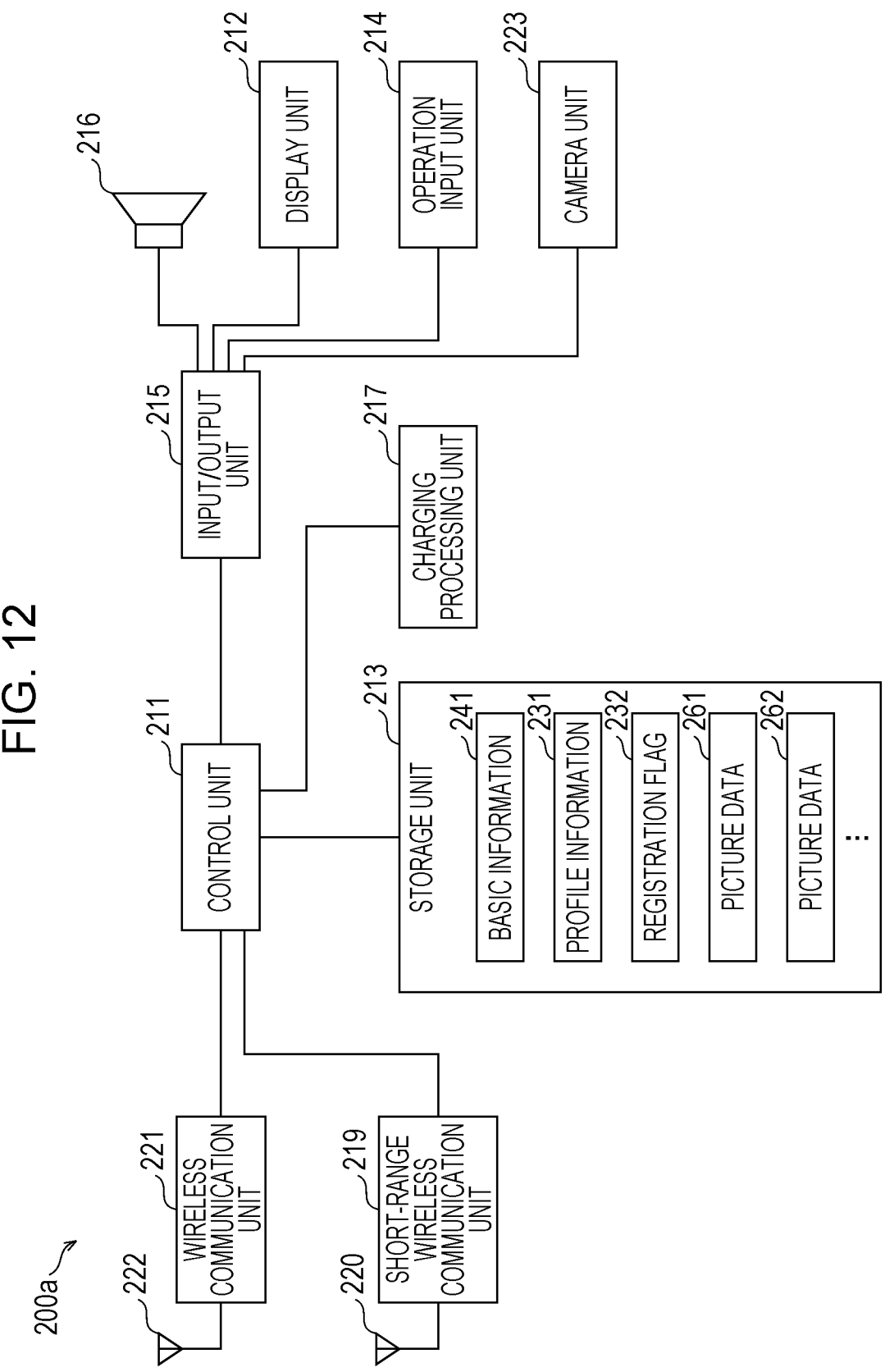
FIG. 12 is a functional block diagram illustrating a functional configuration of a mobile terminal.

FIG. 12 is a functional block diagram illustrating a functional configuration of the mobile terminal 200a.

The mobile terminal 200a is a portable mobile communication device having functions such as a telephone call function, an electronic mail transmitting and receiving function, a network connection function, a picture-taking function, and an application program executing function. As illustrated in FIG. 12, the mobile terminal 200a includes a control unit 211, a display unit 212, a storage unit 213, an operation input unit 214, an input/output unit 215, a speaker 216, a charging processing unit 217, a short-range wireless communication unit 219, an antenna 220, a wireless communication unit 221, an antenna 222, a camera unit 223, and so on.

(1) Storage Unit 213

The storage unit 213 serves as a work area for a control program executed by the control unit 211. The storage unit 213 includes a RAM or the like that stores various control programs, application programs, image data, and so on.

Further, the storage unit 213 stores in advance basic information 241 or 242 illustrated in FIG. 13B or 13C, by way of example. The basic information is identification information used to identify a mobile terminal. As an example, the basic information 241 includes the model name "SmartPhone X" and the user name "YY Ichiro". As an example, the basic information 242 includes the OS name "Operating System 3.0", the model name "ABC123", and the user name "XX Taro". Information on elements of basic information differs from one mobile terminal manufacturer to another.

A user can register profile information, which is information related to the user, in the mobile terminal 200a. The profile information is part of identification information. The content registered as the profile information can be set by the user, as desired. The storage unit 213 stores profile information 231 illustrated in FIG. 13A, by way of example, in accordance with the setting made by the user. The profile information 231 includes part of the home address of the user, by way of example. The profile information 231 may include any other information related to the user. For example, the profile information 231 may include the age, gender, interests, and the like of the user. When the user configures profile information, a registration flag 232 set to "1", which indicates that the user configures the profile information, is stored in the storage unit 213.

When the user configures the profile information, information generated by combining the basic information and the profile information is used as identification information. By way of example, identification information 243 or 244 illustrated in FIG. 13D or 13E is generated by combining the basic information 241 or 242 illustrated in FIG. 13B or 13C with the profile information. A mobile terminal is identified by using not only basic information but also identification information including basic information and profile information.

Further, the storage unit 213 stores picture data 261, picture data 262, and so on. The picture data 261, the picture data 262, and so on are each compressed picture data having a data structure specified by the Joint Photographic Experts Group (JPEG), by way of example. The picture data 261, the picture data 262, and so on may have any other type of data structure.

(2) Control Unit 211

The control unit 211 reads a necessary control program or the like from, the storage unit 213 and executes the control program or the like to control the overall operation of the mobile terminal 200a. The control unit 211 further reads and executes an application program. The control unit 211 controls the wireless communication unit 221, the short-range wireless communication unit 219, the charging processing unit 217, and the input/output unit 215. The control unit 211 accesses the storage unit 213 to read and write information.

(3) Display Unit 212

The display unit 212 is a liquid, crystal display device, for example. The display unit 212 may be an EL display device or the like.

Figure 14:
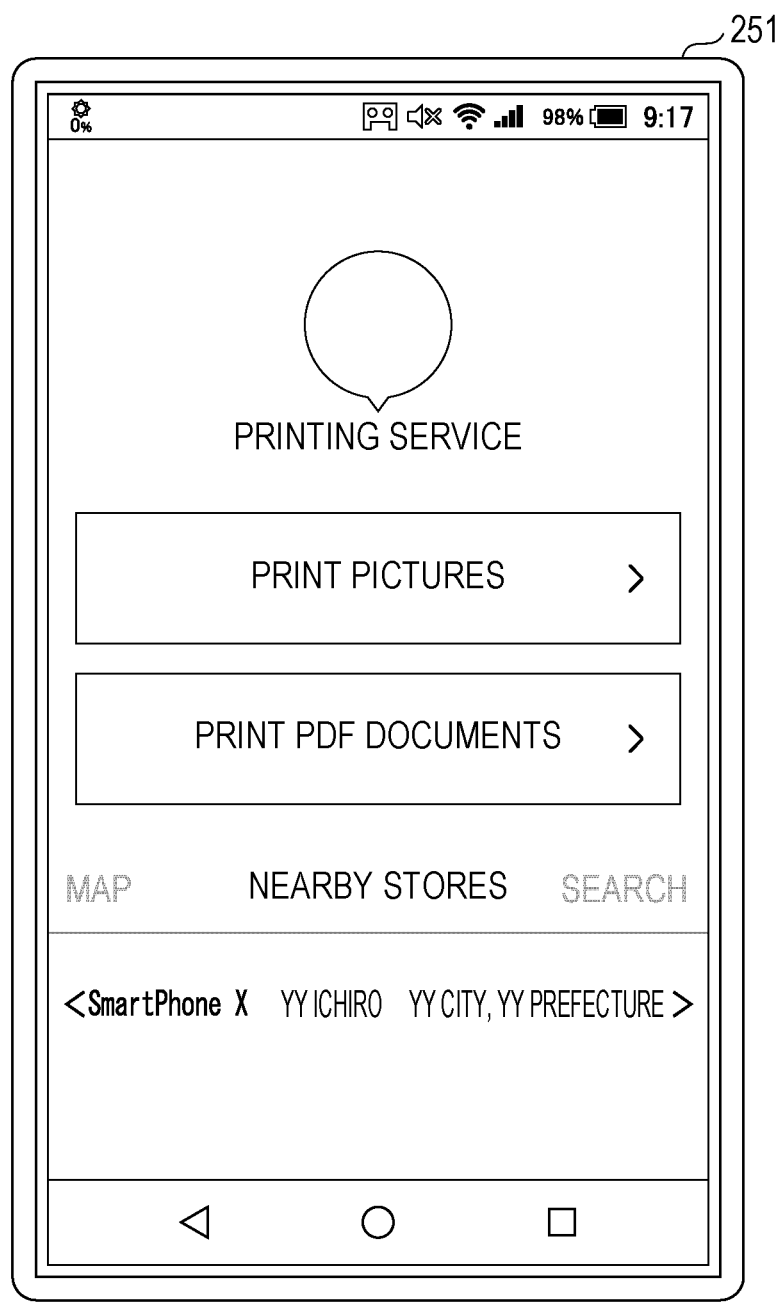
FIG. 14 illustrates a screen displayed on a display unit of the mobile terminal, the screen including operation images and the like that are touched by the user of the mobile terminal to receive a printing service.

FIG. 14 illustrates a screen 251 displayed on the display unit 212, by way of example. The screen 251 includes operation images and the like that are touched by the user to receive a printing service. One of the operation images is operated to start a wireless communication transmission application program (hereinafter referred to as a wireless communication transmission application). The wireless communication transmission application is, for example, a computer program for transmitting picture data or document data to the image forming apparatus 100. The picture data or document data transmitted to the image forming apparatus 100 is printed on a paper medium or the like by the image forming apparatus 100. On the screen 251, identification information identifying the mobile terminal 200a is also displayed.

Figure 15:
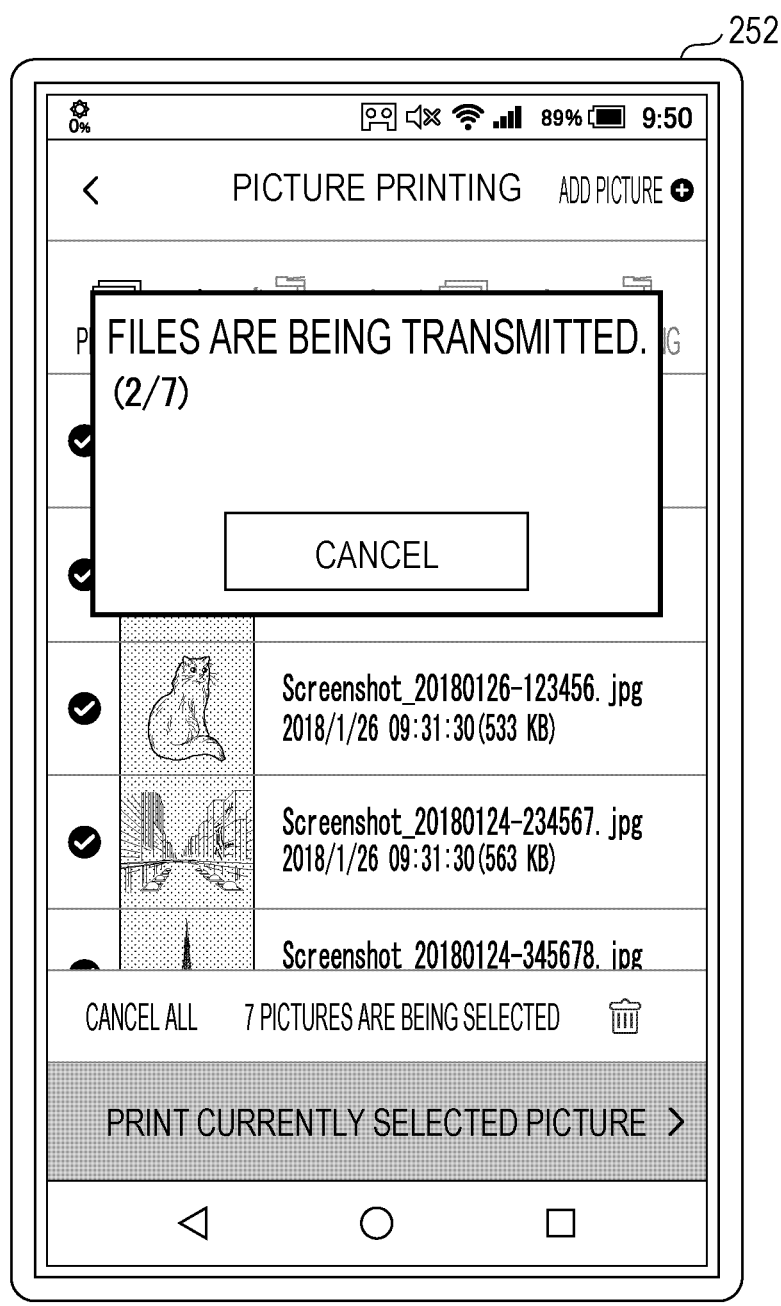
FIG. 15 illustrates a screen displayed on the display unit of the mobile terminal, the screen including a message or the like indicating the operation status of the printing service.

FIG. 15 illustrates a screen 252 displayed on the display unit 212, by way of example. The screen 252 shows a message indicating that files are being transmitted from, the mobile terminal 200a to the image forming apparatus 100 to receive a printing service.

(4) Operation Input Unit 214

The operation input unit 214 has a plurality of operation keys and a touch panel overlaid on a screen of the display unit 212. The operation input unit 214 outputs an input instruction corresponding to an operation performed by the operator of the mobile terminal 200a with the operation keys or an operation on the touch panel to the control unit 211 via the input/output unit 215. For example, in response to the input instruction from the operation input unit 214, the control unit 211 reads picture data stored in the storage unit 213 and transmits the read picture data to the image forming apparatus 100 by using short-range wireless communication via the short-range wireless communication unit 219 and the antenna 220.

(5) Speaker 216, Camera Unit 223 and Input/Output Unit 215

The speaker 216 outputs audio in a conversation with any other mobile terminal or the like. Further, the speaker 216 reproduces audio data stored in the storage unit 213 under control of the control unit 211 and outputs audio.

The camera unit 223 captures an image of a surrounding scene under control of the control unit 211 and generates a still image or a moving image.

The input/output unit 215 relays input and output of data between the control unit 211 and each of the display unit 212, the operation input unit 214, the speaker 216, and the camera unit 223.

(6) Charging Processing Unit 217

The charging processing unit 217 determines whether to authorize the payment of, for example, charging information indicating a fee to be charged, which is transmitted from the image forming apparatus 100, and transmits a determination result to the image forming apparatus 100.

(7) Short-Range Wireless Communication Unit 219, Antenna 220, Wireless Communication Unit 221, and Antenna 222

The short-range wireless communication unit 219 communicates with communication terminals located in the wireless communication area 30 in which the mobile terminal 200a is located over short-range wireless communication via the antenna 220. The communication terminal located in the wireless communication area 30 and serving as a communication partner is the image forming apparatus 100, by way of example. If the mobile terminal 200a is located in any other wireless communication area, the short-range wireless communication unit 219 communicates with communication terminals located in the other wireless communication area.

The wireless communication unit 221 wirelessly communicates with a wireless base station via the antenna 222. The wireless base station is connected to one end of a mobile phone network, and another wireless base station is connected to the other end of the mobile phone network. The other wireless base station wirelessly communicates with other communication terminals. Consequently, the wireless communication unit 221 can communicate with other communication terminals or the like via the antenna 222, the wireless base station, the mobile phone network, and the other wireless base station.

1.4 First Example

A first example, which provides an operation performed using a mobile terminal in the configuration of profile information, will be described with reference to a flowchart illustrated in FIG. 16.

The operation input unit 214 of the mobile terminal 200a receives various operations from the user (step S101). When the received operation is to start a registration application program (hereinafter referred to as a registration application) that configures profile information in the mobile terminal 200a (YES in step S102), the mobile terminal 200a executes the registration application, and the operation input unit 214 accepts the input of profile information from the user (step S103). Then, the control unit 211 sets the registration flag to "1" (step S104). Then, the control unit 211 writes the profile information, for which the input has been accepted, and the registration flag to the storage unit 213 (step S105). Then, the display unit 212 displays identification information including basic information and profile information (step S106).

The processing of steps S103 to S106 is performed by using the registration application.

Then, the configuration of profile information by the user is complete.

If the received operation is not to start the registration application (NO in step S102), other preprocessing corresponding to the received operation is performed (step S107).

Here, profile information is configured using the mobile terminal 200a, which is not limiting. Profile information may be configured using any of the other mobile terminals 200b to 200e.

As described above, the user's own profile information is configurable with the mobile terminal 200a. This enables the user to recognize their own mobile terminal by using the profile information.

1.5 Second Example

The following describes a second example, which provides operations performed in the generation, display, and acceptance of the selection of a mobile terminal list using the image forming apparatus 100, the establishment of communication via short-range wireless communication between the image forming apparatus 100 and mobile terminals, and a printing service provided by the image forming apparatus 100.

Figure 16:
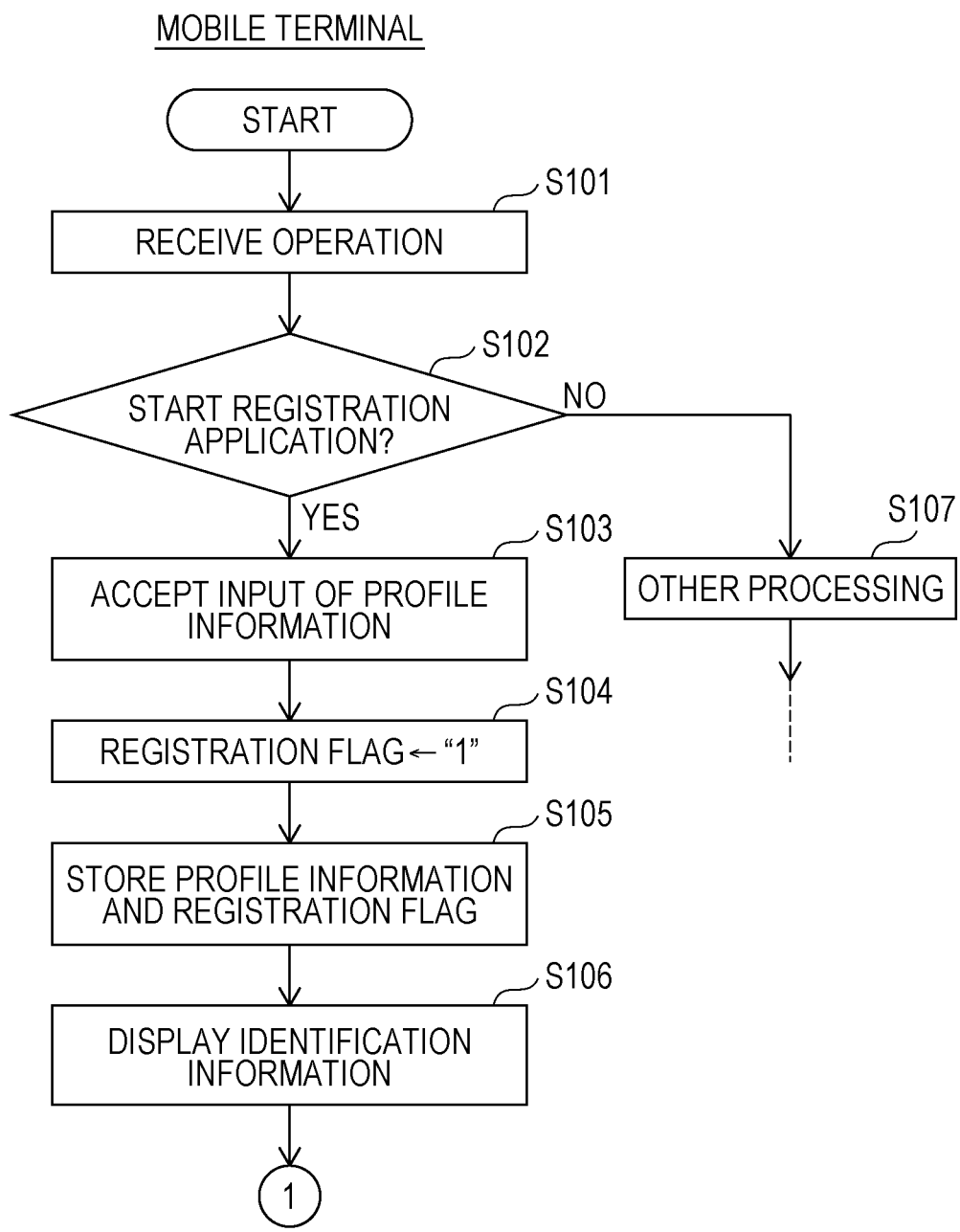
FIG. 16 is part of a flowchart illustrating the operation of setting profile information for a mobile terminal.
Figure 17:
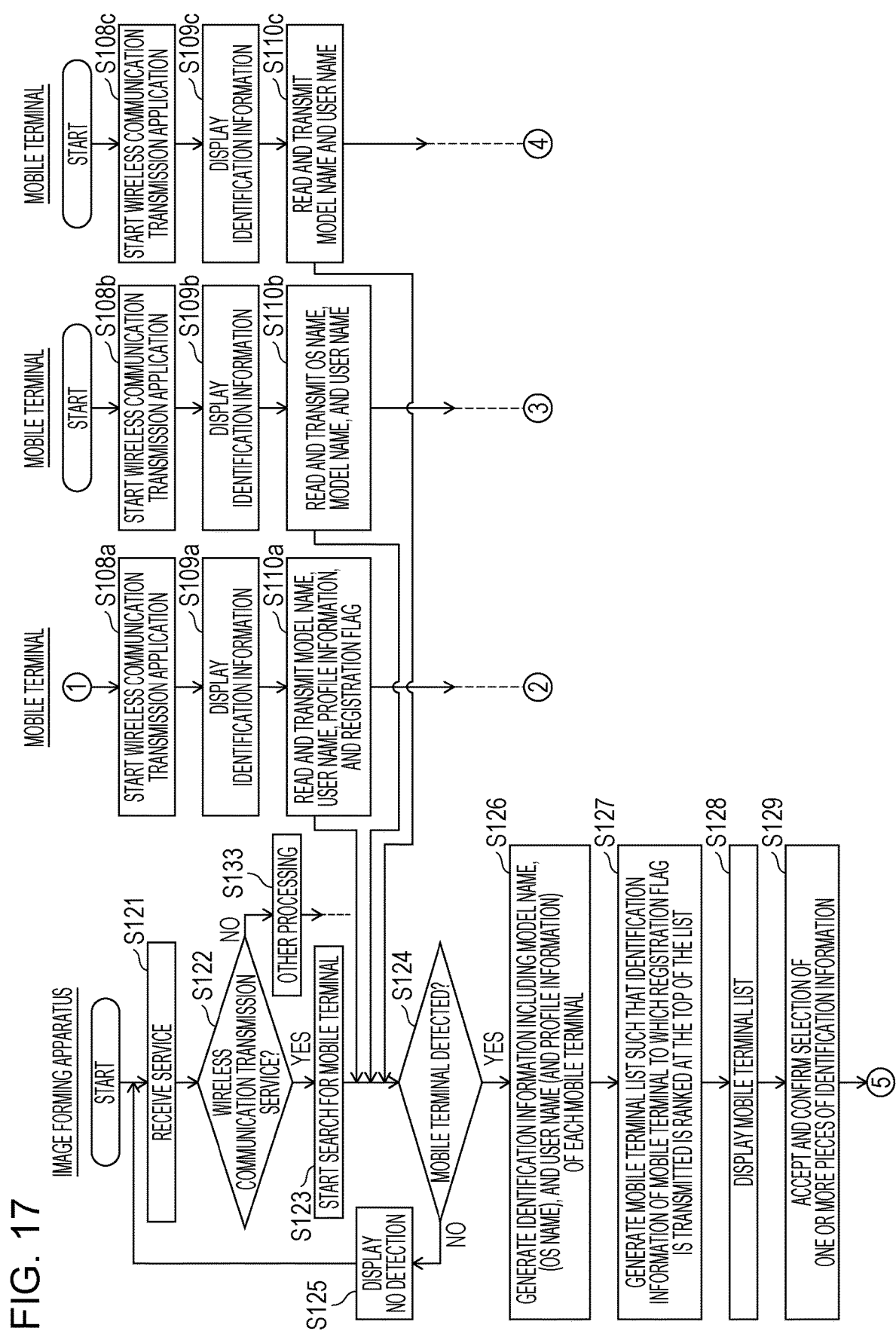
FIG. 17 is part of the flowchart, which is continued from FIG. 16, illustrating operations such as starting a wireless communication transmission application on mobile terminals, and generating and displaying a mobile terminal list and accepting selection using the image forming apparatus.
Figure 18:
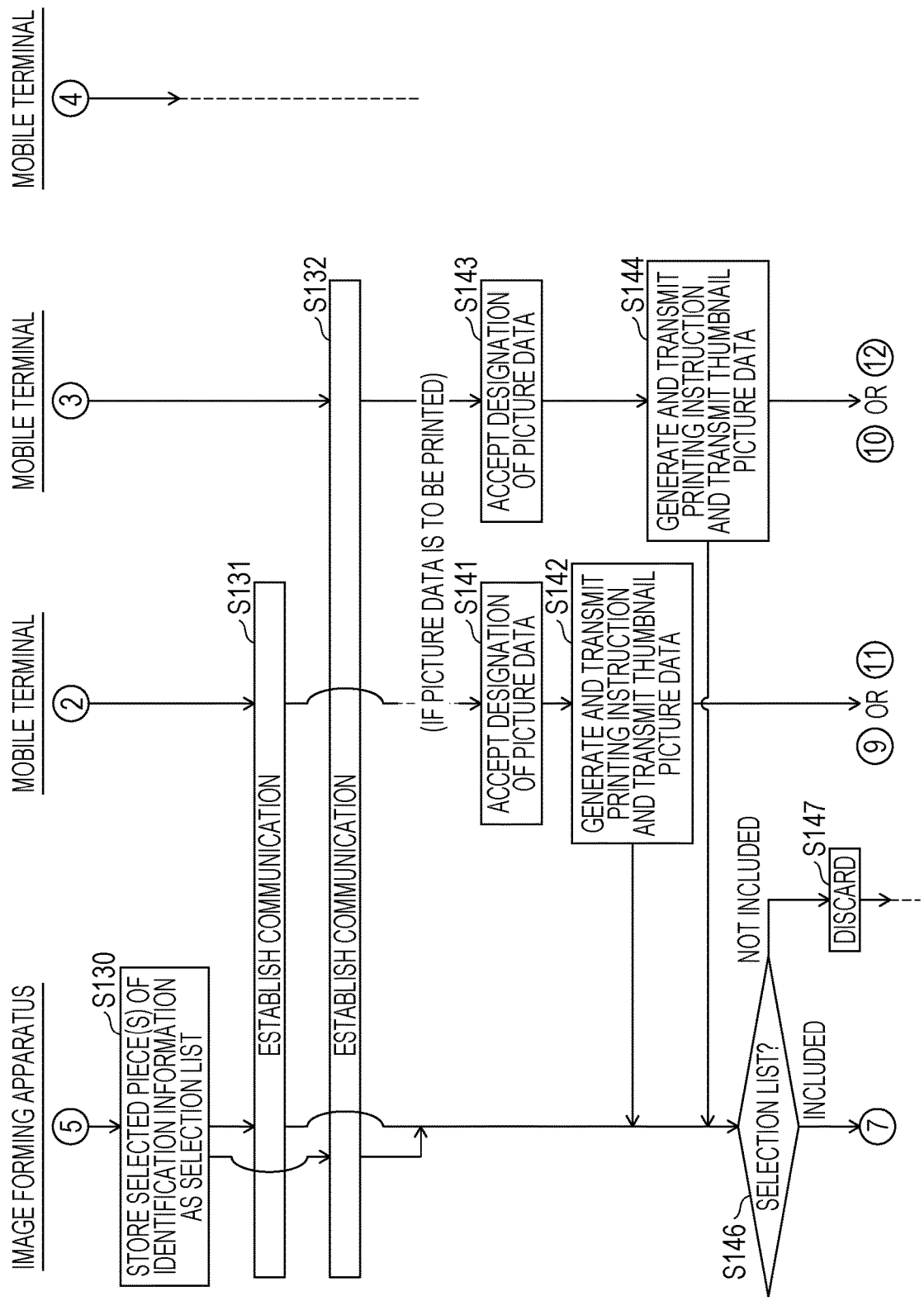
FIG. 18 is part of the flowchart, which is continued from FIG. 17, illustrating operations such as storing a selection list using the image forming apparatus, establishing communication between the image forming apparatus and the mobile terminals, and providing printing instructions from the mobile terminals.
Figure 19:
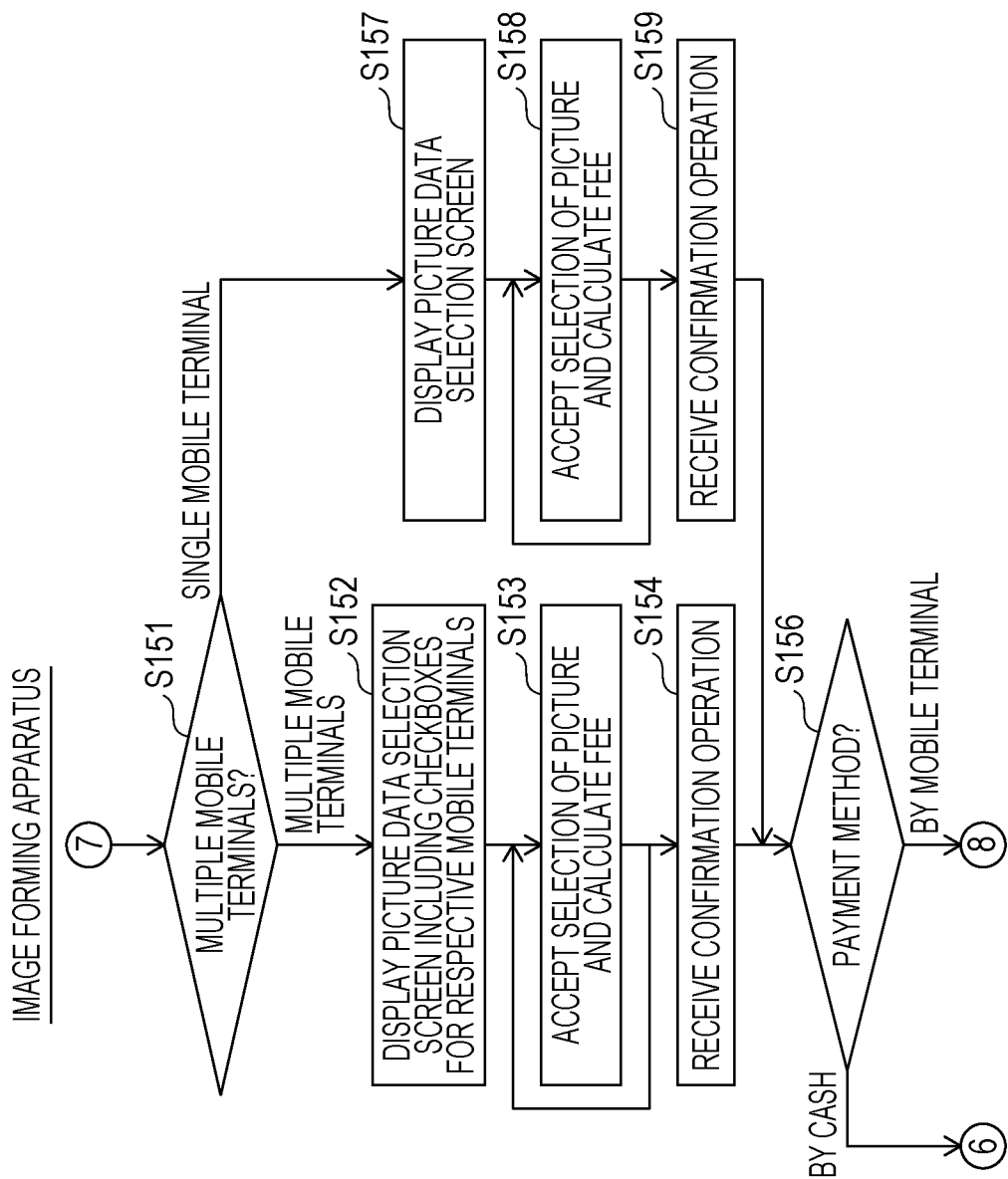
FIG. 19 is part of the flowchart, which is continued from FIG. 18, illustrating operations of the image forming apparatus, such as selecting a picture by a user.

(1) Generation, Display, and Acceptance of Selection of Mobile Terminal List 301 Using Image Forming Apparatus 100, and Establishment of Communication Via Short-Range Wireless Communication Between Image Forming Apparatus 100 and Mobile Terminals Subsequent to the description of the operation of configuring profile information by the user illustrated in FIG. 16, the operations performed in the generation, display, and acceptance of the selection of the mobile terminal list 301 using the image forming apparatus 100 and the establishment of communication via short-range wireless communication between the image forming apparatus 100 and mobile terminals will be described with reference to a flowchart illustrated in FIGS. 17 to 18.

The control unit 111 of the mobile terminal 200a starts the wireless communication transmission application in accordance with an input operation by the user (see FIG. 14) (step S108a). Then, the control unit 111 reads the basic information (the model name and the user name), the profile information, and the registration flag from the storage unit 213, and the display unit 212 displays identification information including the basic information and the profile information (step S109a), and transmits the read basic information (the model name and the user name), profile information, and registration flag to the image forming apparatus 100 via the short-range wireless communication unit 119 (step S110a).

The control unit 111 of the mobile terminal 200b also starts the wireless communication transmission application in accordance with an input operation by the user (see FIG. 14) in a way similar to that described above (step S108b). Then, the control unit 111 reads the basic information (the OS name, the model name, and the user name) from the storage unit 213, and the display unit 212 displays identification information including the basic information (step S109b), and transmits the read basic information (the OS name, the model name, and the user name) to the image forming apparatus 100 via the short-range wireless communication unit 119 (step S110b).

Further, the control unit 111 of the mobile terminal 200c also starts the wireless communication transmission application in accordance with an input operation by the user (see FIG. 14) in a way similar to that described above (step S108c). Then, the control unit 111 reads the basic information (the model name and the user name) from the storage unit 213, and the display unit 212 displays identification information including the basic information (step S109c), and transmits the read, basic information (the model name and the user name) to the image forming apparatus 100 via the short-range wireless communication unit 119 (step S110c).

In the foregoing description, when the wireless communication transmission application is started, identification information including basic information or identification information including basic information and profile information is displayed, which is not limiting. Each mobile terminal may display basic, information as a default value when no application has been started.

The operation input unit 114 of the image forming apparatus 100 accepts the input of a service from the user (step S121). The service for which the input is accepted includes a wireless communication transmission service, that is, a printing service or a scanning service. When, the service for which the input has been accepted is not a wireless communication transmission service (NO in step S122), the control unit 111 performs other processing corresponding to the service for which the input has been accepted (step S133).

When the service for which the input has been accepted is a wireless communication transmission service (YES in step S122), the control unit 111 starts a search for a mobile terminal by using the short-range wireless communication unit 119. That is, the control unit 111 determines whether basic information or the like has been transmitted from each mobile terminal by using the short-range wireless communication unit 119 (step S123).

If the control unit 111 detects no mobile terminal, that is, if basic information or the like transmitted from a mobile terminal is not detected ("NO" in step S124), the display unit 212 displays a message indicating that no mobile terminal has been detected (step S125). Then, the control unit 111 advances the process to step S121, and continuously performs the process.

If the control unit 111 has detected a mobile terminal, that is, if basic information or the like transmitted from a mobile terminal is detected ("YES" in step S124), the control unit 111 generates, for each mobile terminal, identification information including basic information (model name, OS name, and user name) and profile information (step S126). Then, the control unit 111 generates the mobile terminal list 301 such that the identification information of a mobile terminal to which the registration flag has been transmitted is preferentially ranked at the top of the mobile terminal list 301 (step S127).

The control unit 111 arranges pieces of identification information in the mobile terminal list 301 in the following manner.

The control unit 111 arranges the identification information transmitted together with the registration flag at the top of the mobile terminal list 301. If a plurality of pieces of identification information transmitted together with the registration flag have been detected, the plurality of pieces of identification information transmitted together with the registration flag are arranged in the order of detection. After the identification information transmitted together with the registration flag, identification information transmitted without any registration flag attached thereto is arranged. If a plurality of pieces of identification information transmitted without any registration flag attached thereto have been detected, the plurality of pieces of identification information transmitted without any registration flag attached thereto are arranged in the order of detection.

Then, the display unit 212 displays the mobile terminal list 301 generated by the control unit 111 (see FIG. 5) (step S128). Then, the operation input unit 214 accepts the selection of one or multiple pieces of identification information by the user from the displayed mobile terminal list 301. Then, when the user touches the operation image 304, the selection of the identification information by the user is confirmed, and a selection list including the selected identification information is created (step S129). Then, the control unit 111 writes the identification information for which the selection has been confirmed to the storage unit 213 as the selection list 147 (step S130). At this point in time, a new mobile terminal is prevented from joining the selection group. The period from when the wireless communication transmission service is started in step S122 to when the selection of identification information is confirmed in step S129 is referred to as a valid period during which identification information is selectable.

Here, mobile terminals indicated by the identification information in the selection list 147 are represented as mobile terminals in the selection group 40 illustrated in FIG. 1, by way of example.

The control unit 111 establishes wireless communication with only the mobile terminals indicated by the identification information included in the selection list 147 (steps S131 and S132). For example, when identification information indicating the mobile terminals 200a and 200b is included in the selection list 147 and when, for example, identification information indicating the mobile terminal 200c is not included in the selection list 147, the control unit 111 establishes wireless communication with only the mobile terminals 200a and 200b. In contrast, the control unit 111 does not establish wireless communication with the mobile terminal 200c.

Thus, after that, the control unit 111 is able to wirelessly communicate with the mobile terminals 200a and 200b for which the identification information is included in the selection list 147, whereas the control unit 111 is not able to wirelessly communicate with the mobile terminal 200c for which the identification information is not included in the selection list 147.

Then, the generation, display, and acceptance of the selection of the mobile terminal list 301 using the image forming apparatus 100 and the establishment of communication via short-range wireless communication between the image forming apparatus 100 and a mobile terminal are complete.

As described above, only the respective mobile terminals of a plurality of users having a certain relationship can share the image forming apparatus 100 for use over short-range wireless communication. At this time, the use of the image forming apparatus 100 by any third party other than the plurality of users can be rejected. This can prevent data owned by a plurality of users having a certain relationship from being made accessible to any third party.

In addition, the identification information displayed in the mobile terminal list 301 on the screen 300 can include profile information of users. A user is able to easily select identification information indicating their own mobile terminal by viewing their own profile information.

(2) Printing Service Provided by Image Forming Apparatus 100

The operations in a printing service provided by the image forming apparatus 100, which are subsequent to the operation of establishing communication via short-range wireless communication between the image forming apparatus 100 and the mobile terminals illustrated in FIG. 18, will be described with reference to a flowchart illustrated in FIGS. 18 to 21.

After the establishment of wireless communication between the image forming apparatus 100 and the mobile terminals 200a and 200b, the operation input unit 214 of the mobile terminal 200a accepts the designation of one or more pieces of picture data by the user from among the pieces of picture data stored in the storage unit 213 (step S141). The user may designate all the pieces of picture data stored in the storage unit 213 or designate some of the pieces of picture data. Not all of the designated pieces of picture data are printed. As described below, the picture data to be printed is designated in the image forming apparatus 100. Then, the control unit 211 generates a printing instruction for the picture data for which the designation has been accepted, and transmits the generated printing instruction and thumbnail picture data, which is obtained by reducing the size of the picture data for which the designation has been accepted, to the image forming apparatus 100 via the short-range wireless communication unit 119 (step S142). The thumbnail picture data is transmitted in order to reduce the time taken to transmit data.

The operation input unit 214 of the mobile terminal 200*b* also accepts the designation of one or more pieces of picture data by the user among the pieces of picture data stored in the storage unit 213 in a way similar to that described above (step S143). Then, the control unit 211 generates a printing instruction for the picture data for which the designation has been accepted, and transmits the generated printing instruction and thumbnail picture data, which is obtained by reducing the size of the picture data for which the designation has been accepted, to the image forming apparatus 100 via the short-range wireless communication unit 119 (step S144).

The control unit 111 receives the printing instruction and the thumbnail picture data from each mobile terminal via the short-range wireless communication unit 119 (step S142, S144).

The control unit 111 determines whether identification information indicating each of the mobile terminals that have transmitted the printing instructions is included in the selection list 147 (step S146). If the identification information is not included in the selection list 147 ("NOT INCLUDED" in step S146), the control unit 111 discards the received printing instruction and the thumbnail picture data (step S147).

If the identification information indicating each of the mobile terminals that have transmitted the printing instructions is included in the selection list 147 ("INCLUDED" in step S146), the control unit 111 determines multiple mobile terminals or a single mobile terminal in accordance with the number of pieces of identification information included in the selection list 147 (step S151), In the case of a single mobile terminal ("SINGLE MOBILE TERMINAL" in step S151), the screen generation unit 128 generates the screen 310 illustrated in FIG. 6 as a picture data selection screen, and the display unit 112 displays the generated screen 310 (step S157). The operation input unit 114 accepts the selection of a picture on the screen 310, and the fee information generation unit 126 calculates a fee in accordance with the selected picture, and generates fee information indicating the fee (step S158). The acceptance of selection and the calculation of a fee are repeatedly performed until the operation image 316 indicating the confirmation of selection is touched. When the operation image 316 is touched (step S159), then, the control unit 111 advances the control to the charging process in step S156.

In the case of multiple mobile terminals ("MULTIPLE MOBILE TERMINALS" in step S151), the screen generation unit 128 generates the screen 320 illustrated in FIG. 7 as a picture data selection screen, and the display unit 112 displays the generated screen 320. On the screen 320, each picture is assigned checkboxes, each of which is associated with one of the mobile terminals (step S152). The operation input unit 114 accepts, for each picture, the selection of a picture for each mobile terminal on the screen 320, and the fee information generation unit 126 calculates fees collectively charged for each mobile terminal on the basis of the picture(s) selected for each mobile terminal and generates fee information indicating the fees (step S153). The acceptance of selection and the calculation of a fee are repeatedly performed until the operation image 338 indicating the confirmation of selection is touched. When the operation image 338 is touched (step S154), then, the control unit 111 advances the control to the charging process in step S156.

The operation input unit 114 accepts the input of a payment method by the user's operation. The payment method is payment by cash or mobile terminal. The control unit 111 determines whether payment by cash or payment by mobile terminal has been designated as a payment method (step S156).

If the payment method indicates payment by mobile terminal ("BY MOBILE TERMINAL" in step S156), the control unit 111 determines multiple mobile terminals or a single mobile terminal in accordance with the number of pieces of identification information included in the selection list 147 (step S161). In the case of a single mobile terminal ("SINGLE MOBILE TERMINAL" in step S161), the control unit 111 transmits fee information to the single mobile terminal as a charging request (step S162).

In the case of multiple mobile terminals ("MULTIPLE MOBILE TERMINALS" in step S161), the control unit 111 distributes the charge to the multiple mobile terminals (step S163), and transmits the distributed fee information to each of the mobile terminals as a charging request (steps S164 and S165).

During the charging process, the display unit 112 displays on the screen 370 illustrated in FIG. 11 the charging process in progress (step S166).

The charging processing unit 217 of the mobile terminal 200*a* performs a process of acknowledging the charge in response to the charging request, and notifies the image forming apparatus 100 of the acknowledgement of the charge (step S167). The charging processing unit 217 of the mobile terminal 200*b* also performs a process of acknowledging the charge in response to the charging request in a similar way, and notifies the image forming apparatus 100 of the acknowledgement of the charge (step S168).

The charging processing unit 117 performs a charging process (step S169), and transmits a notification indicating the completion of the charging process to the mobile terminal 200*a* or the mobile terminals 200*a* and 200*b* (steps S170 and S171).

Then, the charging process with the mobile terminals is complete.

If the payment method indicates payment by cash ("BY CASH" in step S156), the display unit 112 displays the screen 350 illustrated in FIG. 9, and the charging processing unit 117 receives cash (step S201). Then, the charging processing unit 117 transmits a notification indicating the completion of the charging process to the mobile terminals 200*a* and 200*b* (steps S202 and S203).

Then, the charging process with cash is complete.

When the charging process with mobile terminals or the charging process with cash is complete, the data communication unit 125 transmits the picture ID or IDs indicating the selected picture or pictures to the mobile terminals 200*a* and 200*b* (step S204).

Upon receipt of the picture ID or IDs (step S204), the control unit 211 of the mobile terminal 200*a* reads picture data identified by the received picture ID or IDs from the storage unit 213 (step S205), and transmits the read picture data to the image forming apparatus 100 (step S207).

Upon receipt of the picture ID or IDs (step S204), the control unit 211 of the mobile terminal 200*b* also reads the picture data from the storage unit 213 (step S206), and transmits the read picture data to the image forming apparatus 100 (step S208).

The control unit 111 of the image forming apparatus 100 receives the picture data from, the mobile terminals 200*a* and 200*b* (steps S207 and S208).

The control unit 111 determines whether identification information indicating each of the mobile terminals that have transmitted the picture data is included in the selection list 147 (step S209). If the identification information is not included in the selection list 147 ("NOT INCLUDED" in step S209), the control unit 111 discards the received picture data (step S210). If the identification information indicating each of the mobile terminals that have transmitted the picture data is included in the selection list 147 ("INCLUDED" in step S209), the job generation unit 127 generates a print job for each mobile terminal (step S211). Then, the job generation unit 127 rearranges the print jobs in the order of the identification numbers of the mobile terminals (step S212).

Then, the printing unit 115 prints picture data in accordance with the print jobs rearranged in the order of the identification numbers of the mobile terminals (step S213). During the printing operation, the display unit 112 displays the screen 360 illustrated in FIG. 10 to present identification information or the like corresponding to the identification number associated with the currently printed print job (step S214). The processing of steps S213 and S214 is repeatedly performed until the printing of all the print jobs is completed.

When the printing of all the print jobs is completed, the printing service ends.

As described above, a printing service can be provided by transmitting and receiving data between the image forming apparatus 100 and mobile terminals.

The image forming apparatus 100 establishes wireless communication with only a plurality of mobile terminals indicated by identification information for which the selection has been accepted, by using short-range wireless communication. In this case, the image forming apparatus 100 does not establish wireless communication with a third-party mobile terminal indicated by identification information for which the selection has not been accepted. This can minimize the possibility that information on a plurality of mobile terminals with which wireless communication has been established will be made accessible to a user of any third-party mobile terminal.

Further, the job generation unit 127 rearranges the print jobs in the order of the identification numbers of the mobile terminals, and the printing unit 115 prints the picture data in accordance with the print jobs rearranged in the order of the identification numbers of the mobile terminals. Accordingly, a plurality of printed pictures are arranged in the order of the identification numbers of the mobile terminals. This eliminates the need to rearrange the pictures for each mobile terminal user and can save time and effort to sort the plurality of printed pictures by user when distributing the plurality of printed pictures to the respective users.

1.6 Third Example

In a third example, when a plurality of mobile terminals use a service provided by the image forming apparatus 100, whether the fees for the service are paid by a specific one of the plurality of mobile terminals (i.e., paid by a single specific user) or by the respective mobile terminals (i.e., individually paid by a plurality of users) is selected.

The display unit 112 of the image forming apparatus 100 displays the screen 340 illustrated in FIG. 8 for prompting the user to select a payment method, by way of example.

As described above, the screen 340 includes the operation image 341, which is touched by the user to select payment by a person, and the operation image 342, which is touched by the user to select payment by persons. When the operation image 341 is touched, the fees for the service are paid by a specific one of the plurality of mobile terminals. In contrast, when the operation image 342 is touched, the fees are paid by the respective mobile terminals.

When the operation image 341 is touched, the image forming apparatus 100 further prompts the user to select which mobile terminal among the plurality of mobile terminals is used to make a payment. The user designates a mobile terminal to be used to make a payment.

Figure 20:
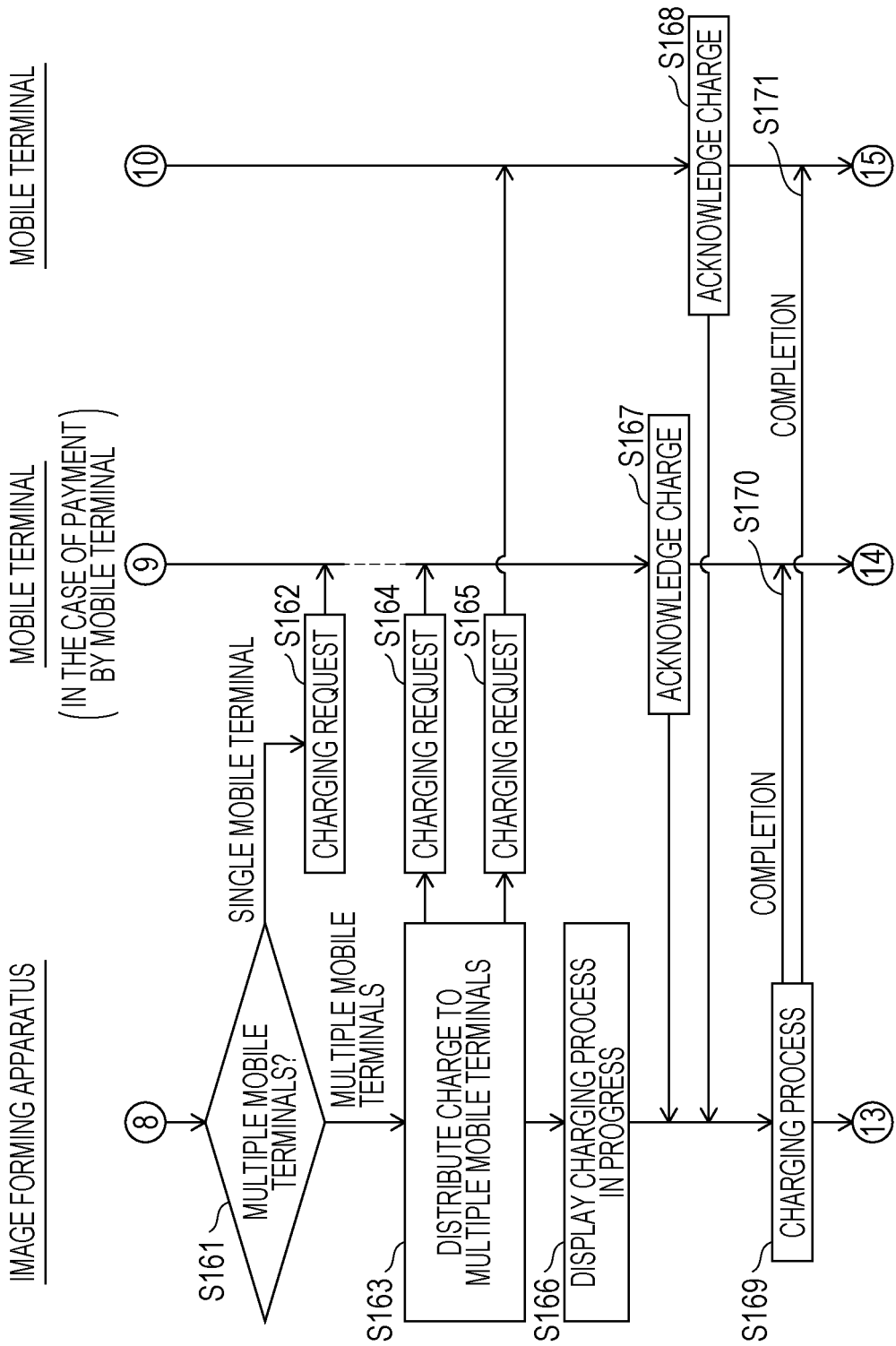
FIG. 20 is part of the flowchart, which is continued from FIG. 19, illustrating operations such as a charging process performed by the image forming apparatus 100.
Figure 21:
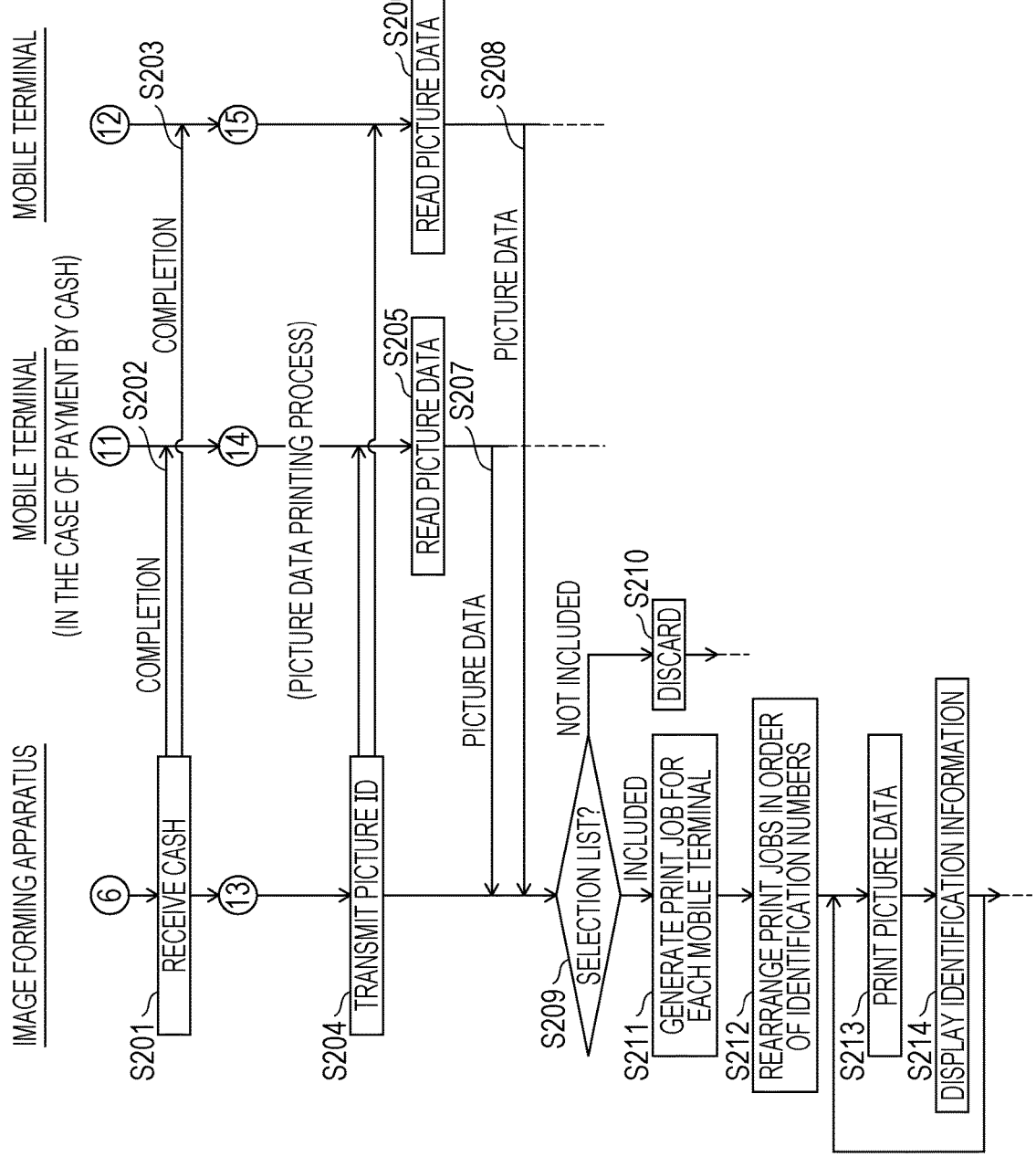
FIG. 21 is part of the flowchart, which is continued from FIG. 20, illustrating operations such as a charging process with cash, transmitting picture data from the mobile terminals, and printing the picture data using the image forming apparatus.
Figure 22:
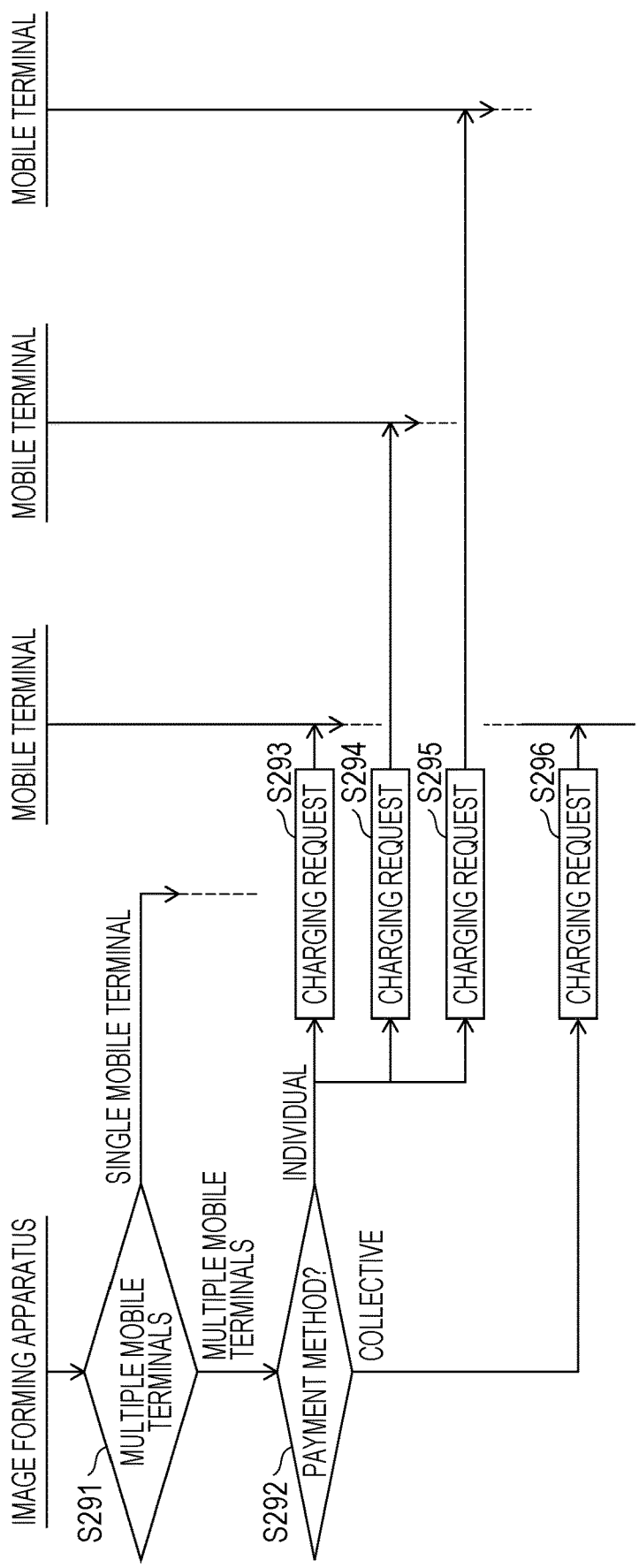
FIG. 22 is a flowchart illustrating an operation corresponding to a payment method using the image forming apparatus in the case of a charging process with the mobile terminals.

Next, an operation performed by the image forming apparatus 100 in accordance with the payment method, instead of the operation of distributing the charge in the case of a plurality of mobile terminals and sending charging requests illustrated in FIG. 20 (steps S161 to S165), will be described with reference to a flowchart illustrated in FIG. 22.

The control unit 111 of the image forming apparatus 100 determines whether a plurality of mobile terminals use the service by determining whether the selection list 147 includes a plurality of pieces of identification information (step S291). In the case of a single mobile terminal ("SINGLE MOBILE TERMINAL" in step S291), the charging processing unit 117 makes the single mobile terminal pay the fee for the service.

In the case of multiple mobile terminals ("MULTIPLE MOBILE TERMINALS" in step S291), the control unit 111 determines whether the payment method selected by the user indicates payment using a specific one of the plurality of mobile terminals or using each of the plurality of mobile terminals (step S292).

If the payment method indicates payment using each of the plurality of mobile terminals ("INDIVIDUAL" in step S292), the charging processing unit 117 generates a charging request for each of the mobile terminals and transmits the charging requests to the respective mobile terminals (steps S293, S294, and S295).

If the payment method indicates payment using a specific one of the plurality of mobile terminals ("COLLECTIVE" in step S292), the charging processing unit 117 generates a charging request for the specific mobile terminal selected by the user and transmits the charging request to the specific mobile terminal (step S296).

Upon receipt of the charging request, each mobile terminal authorizes the charging request, and the charging process for each mobile terminal is performed.

As described above, when a plurality of mobile terminals use a service, a payment method can be selected in accordance with whether the payment method selected by the user indicates payment using a specific one of the plurality of mobile terminals or payment using each of the plurality of mobile terminals. A more flexible payment method can thus be provided.

1.7 Fourth Example

Figure 23:
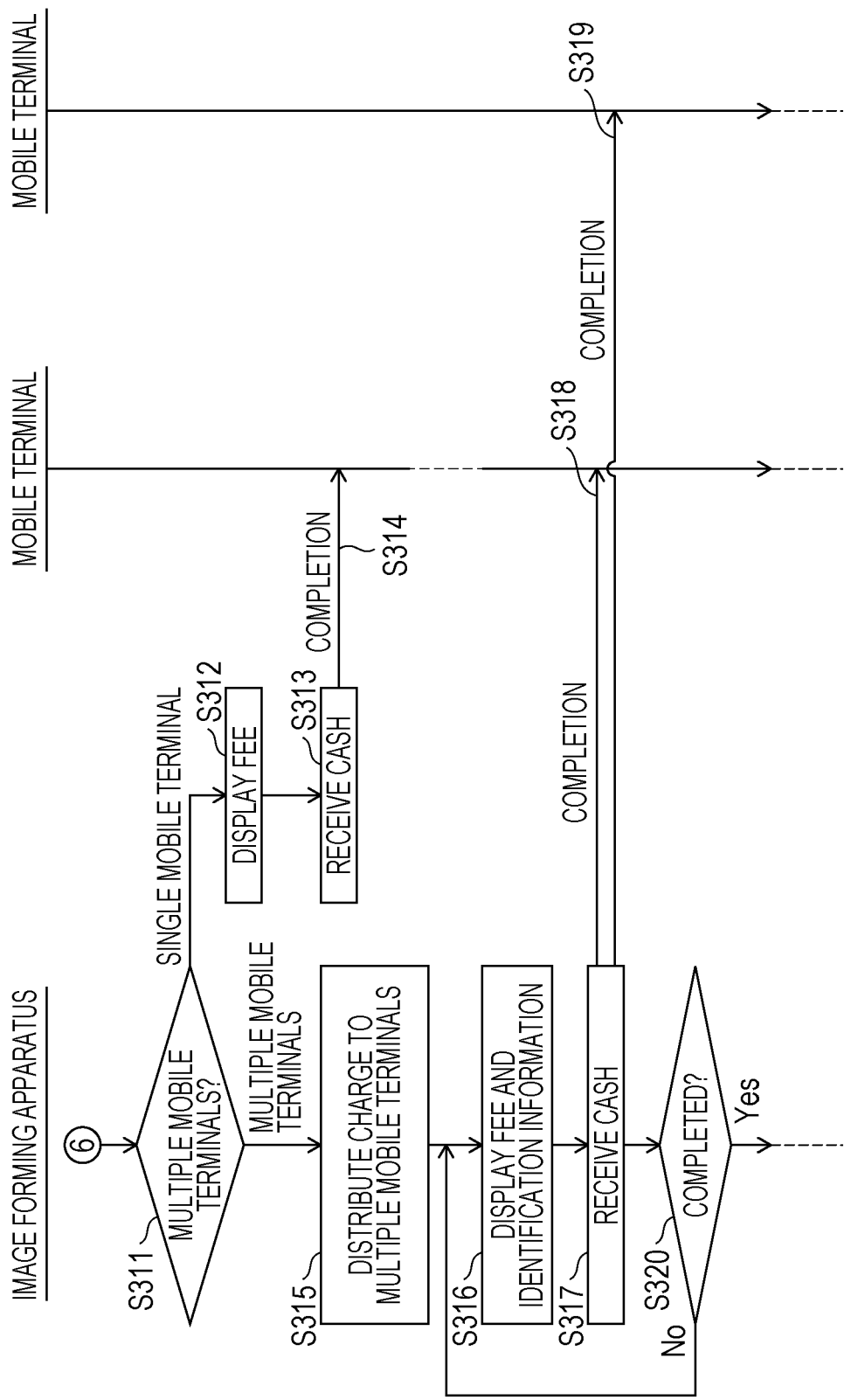
FIG. 23 is a flowchart illustrating an operation corresponding to a payment method using the image forming apparatus in the case of a charging process with cash.

In a fourth example, an operation performed when a service provided by the image forming apparatus 100 is used and the fee for the service is paid by cash, in particular, an operation performed when the charge is distributed to a plurality of mobile terminals of a plurality of users, will be described with reference to a flowchart illustrated in FIG. 23. The operation described below replaces the operation of receiving cash illustrated in FIG. 21 (steps S201 to S203).

The control unit 111 of the image forming apparatus 100 determines whether a plurality of mobile terminals use the service by determining whether the selection list 147 includes a plurality of pieces of identification information (step S311). In the case of a single mobile terminal ("SINGLE MOBILE TERMINAL" in step S311), the display unit 112 displays a screen similar to the screen 350 illustrated in FIG. 9 to present the fee and so on (step S312), and the charging processing unit 117 receives cash (step S313). Then, the charging processing unit 117 transmits a notification indicating the completion of the charging process to the mobile terminal 200*a* (step S314). Then, the cash receiving process ends.

In the case of multiple mobile terminals ("MULTIPLE MOBILE TERMINALS" in step S311), the charging processing unit 117 distributes the charge to the plurality of mobile terminals (step S315).

The screen 350 illustrated in FIG. 9 is displayed for each of the mobile terminals to present the fee and identification information or the like that identifies the mobile terminal (step S316), and the charging processing unit 117 receives cash (step S317). Then, the charging processing unit 117 transmits a notification indicating the completion of the charging process to the mobile terminal (step S318 or S319). Then, the cash receiving process is complete for this mobile terminal.

If the processing of steps S316 to S319 is not completed for all the mobile terminals that receive the service (No in step S320), the control unit 111 advances the control to step S316 and repeatedly performs the process.

If the processing of steps S316 to S319 is completed for all the mobile terminals that receive the service (Yes in step S320), the cash receiving process is complete for all the mobile terminals.

As described above, when a service provided by the image forming apparatus 100 is used and the fee for the service is paid by cash, in particular, when the charge is distributed to a plurality of mobile terminals of a plurality of users, the identification numbers indicating the respective mobile terminals and the fees to be individually paid by the mobile terminals are displayed, and the user of each of the mobile terminals can put cash. This clarifies the amount to be paid by each of the plurality of users and can avoid confusion about the payment of fees to be paid by the plurality of users.

2 Other Modifications

The present disclosure is not limited to the embodiment and the examples described above. The present disclosure may be modified as follows.

(1) First Modification

The selection list 147 has a plurality of pieces of identification information recorded thereon. After the establishment of communication between the image forming apparatus 100 and each of the mobile terminals indicated by the pieces of identification information included in the selection list 147, the valid period of the selection group may be determined in the following way.

(a) After the completion of the printing service and the scanning service for all the mobile terminals indicated by the pieces of identification information included in the selection list 147, that is, when the printing operation is completed and the transmission of multi-level image data generated by the scanning operation is completed, the valid period of the selection group expires.

In this case, immediately after the completion of the printing service and the scanning service, the provision of the next printing service and scanning service can be started.

(b) Even after the completion (a) of the printing service and the scanning service, the valid period of the selection group does not still expire, and the valid period of the selection group expires in response to the user performing an operation on the operation input unit 114 of the image forming apparatus 100 to make the valid period of the selection group expire.

In this case, the user is able to continuously receive the printing service and the scanning service until the user performs the operation of making the valid period of the selection group expire.

(2) Second Modification

Addition to and Deletion from Selection Group

As described above, after selected identification information is stored as a selection list in step S130 illustrated in FIG. 18, a new mobile terminal is prevented from joining the selection group.

However, the present disclosure is not limited thereto.

Even after selected identification information is stored as a selection list, a new mobile terminal may be allowed to join the selection group.

The display unit 112 of the image forming apparatus 100 may display the screen 300 illustrated in FIG. 5 again, and a user may select new identification information from the mobile terminal list 301 on the screen 300. Accordingly, a new mobile terminal joins the selection group.

Furthermore, even after selected identification information is stored as a selection list, the deletion of a mobile terminal from the selection group may be permitted.

The display unit 112 of the image forming apparatus 100 may display the screen 300 illustrated in FIG. 5 again, and a user may delete selected identification information from the mobile terminal list 301 on the screen 300. Accordingly, any of the registered mobile terminals is newly deleted from the selection group.

Accordingly, the addition of a new mobile terminal to the selection group and the deletion of a mobile terminal from the selection group are available, achieving flexible use.

(3) Third Modification

The data communication unit 125 may transmit an identification number generated by the number assignment unit 124 to each mobile terminal via the short-range wireless communication unit 119. In this case, each mobile terminal receives the identification number and displays the received identification number.

The configuration described above allows the user to know whether an identification number displayed on the screen 320 indicates their own mobile terminal by using the identification number displayed on the mobile terminal.

(4) Fourth Modification

The image forming apparatus 100 and each mobile terminal are each a computer system including a microprocessor and a memory. The memory stores a control computer program, and the microprocessor operates in accordance with the control computer program.

The control computer program may be recorded on a computer-readable recording medium such as a flexible disk, a hard disk, an optical disk, or a semiconductor memory.

The control computer program may be transmitted via a telecommunication line, a network such as the Internet, or the like.

(5) The embodiment described above, the examples described above, and the modifications described above may be provided in combination.

An image forming apparatus according to an embodiment f the present disclosure does not receive data from any third-party mobile terminal not included in a selection group, and printed copies that are printed based on only the data received from a plurality of mobile terminals included in the selection group and that are output to a discharge tray of the image forming apparatus are not mixed with printed copies that are printed based on data received from the third-party mobile terminal. This can minimize the possibility that information on the plurality of mobile terminals will be made accessible to a user of any third-party mobile terminal. Accordingly, the present disclosure is useful as a technique for receiving data only from, a plurality of mobile terminals via short-range wireless communication and printing the data by using an image forming apparatus.

The present disclosure contains subject matter related to that disclosed in Japanese Priority Patent Application JP 2018-097698 filed, in the Japan Patent Office on May 22, 2018, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image forming apparatus including a short-range wireless communication circuitry, for communicating with a mobile terminal, the image forming apparatus comprising:
    an acquisition circuitry that acquires a plurality of pieces of identification information from a plurality of mobile terminals located in a communication area via the short-range wireless communication circuitry, each of the plurality of pieces of identification information indicating one of the plurality of mobile terminals;
    a display that displays the plurality of pieces of identification information acquired by the acquisition circuitry;
    an operation input circuitry that accepts, in accordance with operation by an operator, selection of at least one of the pieces of identification information displayed on the display and to identify at least one mobile terminal by using the selected at least one of the pieces of identification information;
    a storage that stores a selection list including the at least one of the pieces of identification information selected by the operation input circuitry;
    a data communication circuitry that receives data from the at least one mobile terminal corresponding to the at least one of the pieces of identification information included in the selection list;
    a job generation circuitry that generates a print job by associating the data received by the data communication circuitry with the at least one of the pieces of identification information; and
    a printing circuitry that prints the data on a paper medium in accordance with the print job, wherein
    in the print job, whether to print each of the received data is designated in accordance with operation by the operator, and
    when the selection list includes the plurality of pieces of identification information, the job generation circuitry generates a plurality of print jobs respectively corresponding to the plurality of pieces of identification information.

2. The image forming apparatus according to claim 1, wherein the printing circuitry collectively prints pieces of data for each of the print jobs.

3. The image forming apparatus according to claim 1 further comprising
    a fee information generation circuitry that generates fee information for printing the data by the printing circuitry,
    wherein, in the fee information, it is designated whether to collectively charge a specific one of the plurality of mobile terminals or individually charge the plurality of mobile terminals in accordance with operation by the operator in a case in which the selection list includes the plurality of pieces of identification information.

4. The image forming apparatus according to claim 1, wherein the display further displays, during printing of each piece of data using the printing circuitry, identification information corresponding to the piece of data that is being printed.

5. A service system comprising:
    a plurality of mobile terminals; and
    an image forming apparatus including a short-range wireless communication circuitry and that communicates with the plurality of mobile terminals,
    the image forming apparatus including
    an acquisition circuitry that acquires a plurality of pieces of identification information from a plurality of mobile terminals located in a communication area among the plurality of mobile terminals via the short-range wireless communication circuitry, each of the plurality of pieces of identification information indicating one of the plurality of mobile terminals located in the communication area,
    a display that displays the plurality of pieces of identification information acquired by the acquisition circuitry,
    an operation input circuitry that accepts, in accordance with operation by an operator, selection of at least one of the pieces of identification information displayed on the display and to identify at least one mobile terminal by using the selected at least one of the pieces of identification information,
    a storage that stores a selection list including the at least one of the pieces of identification information selected by the operation input circuitry;
    a data communication circuitry that receives data from the at least one mobile terminal corresponding to the at least one of the pieces of identification information included in the selection list,
    a job generation circuitry that generates a print job by associating the data received by the data communication circuitry with the at least one of the pieces of identification information; and
    a printing circuitry that prints the data on a paper medium in accordance with the print job, wherein
    in the print job, whether to print each of the received data is designated in accordance with operation by the operator, and
    when the selection list includes the plurality of pieces of identification information, the job generation circuitry generates a plurality of print jobs respectively corresponding to the plurality of pieces of identification information.

6. A control method performed by an image forming apparatus, the image forming apparatus including a short-range wireless communication circuitry and communicating with a mobile terminal, the control method comprising:
- an acquiring step of acquiring a plurality of pieces of identification information from a plurality of mobile terminals located in a communication area via the short-range wireless communication circuitry, each of the plurality of pieces of identification information indicating one of the plurality of mobile terminals;
- a displaying step of displaying the plurality of pieces of identification information acquired in the acquiring step;
- an operation inputting step accepting, in accordance with operation by an operator, selection of at least one of the pieces of identification information displayed in the displaying step, and identifying at least one mobile terminal by using the selected at least one of the pieces of identification information;
- a storing step of storing a selection list including the at least one of the pieces of identification information selected in the operation inputting step;
- a data communicating step of receiving data from the at least one mobile terminal corresponding to the at least one of the pieces of identification information included in the selection list;
- a job generating step of generating a print job by associating the data received in the data communicating step with the at least one of the pieces of identification information; and
- a printing step of printing the data on a paper medium in accordance with the print job, wherein
- in the print job, whether to print each of the received data is designated in accordance with operation by the operator, and
- when the selection list includes the plurality of pieces of identification information, a plurality of print jobs respectively corresponding to the plurality of pieces of identification information is generated in the job generating step.

7. A non-transitory recording medium storing a computer program for control, the computer program being executable by an image forming apparatus, the image forming apparatus including a short-range wireless communication circuitry and communicating with a mobile terminal, the computer program being configured to execute:
- an acquiring step of acquiring a plurality of pieces of identification information from a plurality of mobile terminals located in a communication area via the short-range wireless communication circuitry, each of the plurality of pieces of identification information indicating one of the plurality of mobile terminals;
- a displaying step of displaying the acquired plurality of pieces of identification information acquired in the acquiring step;
- an operation inputting step of accepting, in accordance with operation by an operator, selection of at least one of the pieces of identification information displayed in the displaying step, and identifying at least one mobile terminal by using the selected at least one of the pieces of identification information;
- a storing step of storing a selection list including the at least one of the pieces of identification information selected in the operation inputting step;
- a data communication step of receiving data from the at least one mobile terminal corresponding to the at least one of the pieces of identification information included in the selection list,
- a job generating step of generating a print job by associating the data received in the data communicating step with the at least one of the pieces of identification information; and
- a printing step of printing the data on a paper medium in accordance with the print job, wherein
- in the print job, whether to print each of the received data is designated in accordance with operation by the operator, and
- when the selection list includes the plurality of pieces of identification information, a plurality of print jobs respectively corresponding to the plurality of pieces of identification information is generated in the job generating step.

* * * * *